(12) United States Patent
Ozaki

(10) Patent No.: US 9,448,076 B2
(45) Date of Patent: Sep. 20, 2016

(54) NAVIGATION SYSTEM, AND CONTROL METHOD AND PROGRAM FOR NAVIGATION SYSTEM

(71) Applicant: AISIN AW CO., LTD., Anjo-shi, Aichi-ken (JP)

(72) Inventor: Naokazu Ozaki, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/761,240

(22) PCT Filed: Jul. 27, 2014

(86) PCT No.: PCT/JP2014/051636
§ 371 (c)(1),
(2) Date: Jul. 15, 2015

(87) PCT Pub. No.: WO2014/129267
PCT Pub. Date: Aug. 28, 2014

(65) Prior Publication Data
US 2015/0362322 A1   Dec. 17, 2015

(30) Foreign Application Priority Data

Feb. 22, 2013 (JP) ................. 2013-032971
Feb. 22, 2013 (JP) ................. 2013-032977

(51) Int. Cl.
*G01C 21/26* (2006.01)
*G01C 21/30* (2006.01)
*G01S 19/46* (2010.01)
*G01S 19/24* (2010.01)

(52) U.S. Cl.
CPC ............. *G01C 21/26* (2013.01); *G01C 21/30* (2013.01); *G01S 19/24* (2013.01); *G01S 19/46* (2013.01)

(58) Field of Classification Search
CPC ............................. G01C 21/26; G01S 19/12
See application file for complete search history.

(56) References Cited

U.S. PATENT DOCUMENTS

| | | | | |
|---|---|---|---|---|
| 5,579,285 A * | 11/1996 | Hubert | ................. | G01S 5/0009 367/133 |
| 5,936,572 A | 8/1999 | Loomis et al. | | |
| 6,560,536 B1 * | 5/2003 | Sullivan | ................ | G01S 5/0036 342/357.64 |
| 6,633,800 B1 * | 10/2003 | Ward | ................... | B60W 50/02 180/167 |
| 6,701,252 B2 * | 3/2004 | Brown | ................... | G01C 21/20 342/357.57 |

(Continued)

FOREIGN PATENT DOCUMENTS

| | | |
|---|---|---|
| EP | 0605926 A1 | 7/1994 |
| JP | H08-335856 A | 12/1996 |

(Continued)

OTHER PUBLICATIONS

Dec. 11, 2015 Supplementary Search Report issued in European Patent Application No. 14754418.3.

(Continued)

*Primary Examiner* — Thomas Tarcza
*Assistant Examiner* — Alex C Dunn
(74) *Attorney, Agent, or Firm* — Oliff PLC

(57) ABSTRACT

Navigation systems, methods, and programs receive, with a signal receiver, a first signal and a second signal that is different from the first signal. The systems, methods, and programs estimate a region in which a current location is present on the basis of a combination of a status of reception of the first signal and a status of reception of the second signal.

13 Claims, 5 Drawing Sheets

(56) References Cited

U.S. PATENT DOCUMENTS

| | | | |
|---|---|---|---|
| 7,139,647 B2* | 11/2006 | Larsen | G01C 21/00 |
| | | | 342/357.45 |
| 7,421,321 B2* | 9/2008 | Breed | B60C 11/24 |
| | | | 340/442 |
| 8,654,610 B2* | 2/2014 | Megdal | G01S 5/0045 |
| | | | 367/117 |
| 8,994,591 B2* | 3/2015 | Dupray | G01C 21/206 |
| | | | 342/457 |
| 2005/0156753 A1* | 7/2005 | DeLine | B60R 1/12 |
| | | | 340/693.5 |
| 2013/0172019 A1* | 7/2013 | Youssef | G01S 5/0215 |
| | | | 455/456.6 |
| 2014/0022121 A1* | 1/2014 | Donovan | G01C 21/165 |
| | | | 342/357.49 |
| 2014/0070989 A1* | 3/2014 | Wang | G01S 19/21 |
| | | | 342/357.59 |

FOREIGN PATENT DOCUMENTS

| | | |
|---|---|---|
| JP | H1038994 A | 2/1998 |
| JP | H10141968 A | 5/1998 |
| JP | H10311731 A | 11/1998 |
| JP | 2004-156999 A | 6/2004 |
| JP | 2006-333180 A | 12/2006 |
| JP | 2007-010417 A | 1/2007 |

OTHER PUBLICATIONS

Oct. 12, 2015 Supplementary Partial European Search Report issued in European Application No. 14754418.3.

Mar. 4, 2014 International Search Report issued in International Application No. PCT/JP2014/051636.

* cited by examiner

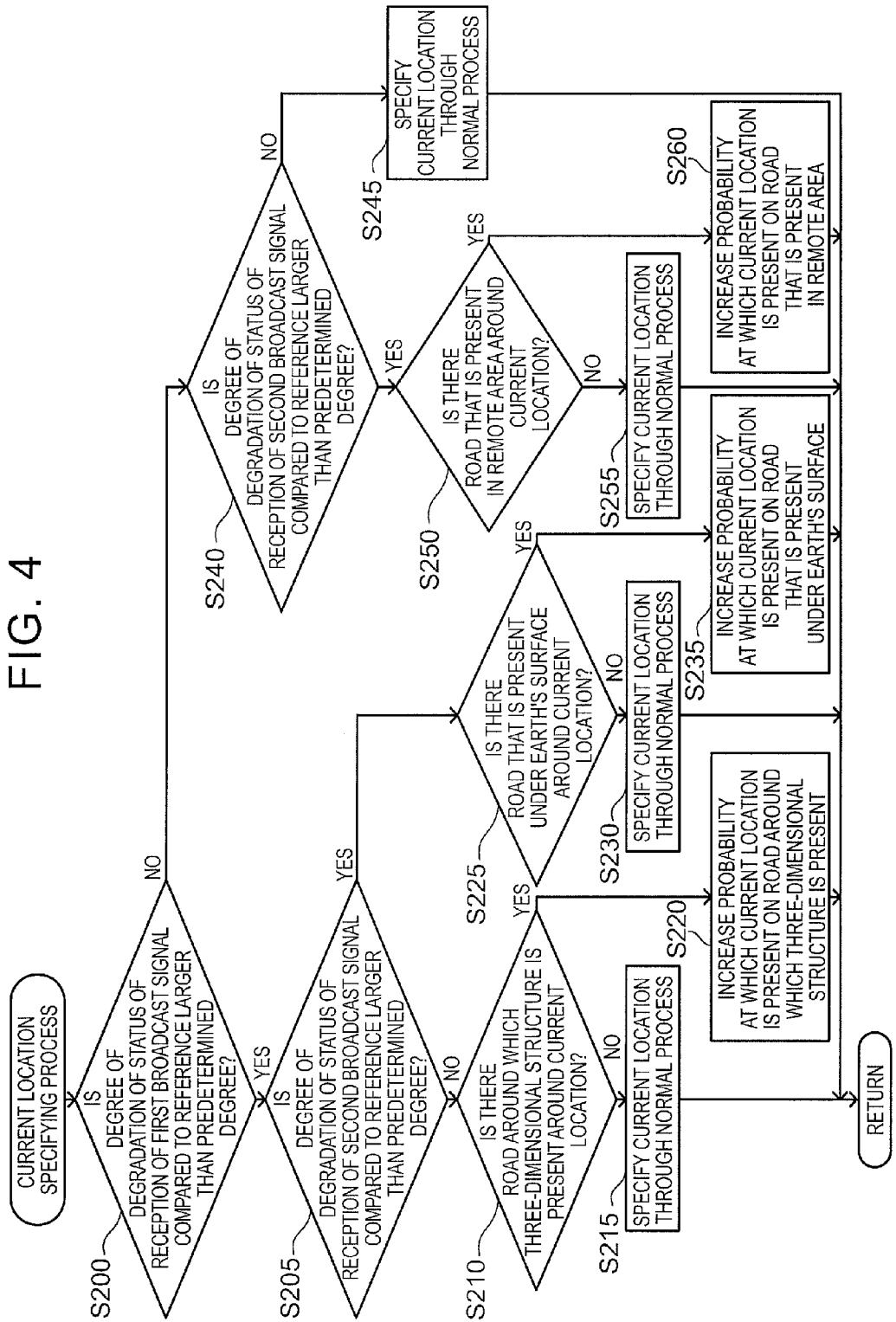

NAVIGATION SYSTEM, AND CONTROL METHOD AND PROGRAM FOR NAVIGATION SYSTEM

TECHNICAL FIELD

Related technical fields include navigation systems that provide guidance on the current location of a vehicle, and control methods and programs for the navigation system.

BACKGROUND ART

Hitherto, there has been known a technology in which the current location of a vehicle on which a navigation device is mounted is acquired on the basis of a GPS signal transmitted from a GPS satellite. For example, Japanese Patent Application Publication No. 10-141968 (JP 10-141968 A) discloses a navigation device configured to specify the current location on the basis of a GPS signal, and further discloses a technology in which it is determined that the vehicle is traveling on an in-tunnel road at a high probability in the case where the position cannot be measured in accordance with a GPS signal.

Hitherto, in addition, there has been developed a technology for specifying the current location without using a GPS signal. For example, a technology in which frequency-region information including the radio wave frequency and the service area of analog broadcast as information is kept and the reception frequency obtained by scanning the analog broadcast radio wave band and the radio wave frequency in the frequency-region information are contrasted with each other to find the current region is known from Japanese Patent Application Publication No. 2006-333180 (JP 2006-333180 A).

SUMMARY

In the related art according to JP 10-141968 A discussed above, it is determined that the vehicle is traveling on an in-tunnel road at a high probability in the case where the position cannot be measured in accordance with a GPS signal. However, roads on which a GPS signal cannot be captured are not limited to an in-tunnel road. For example, a GPS signal cannot be captured in the case where the vehicle is traveling in an underground parking lot. Thus, in the related art, it may be erroneously determined that the vehicle is traveling on an in-tunnel road in such a case. Further, there are many roads on which a GPS signal becomes unstable, such as a road between structures such as high-rise buildings. In the related art, it is also erroneously determined that the vehicle is traveling on an in-tunnel road in the case where a GPS signal cannot be captured on such roads.

In the related art according to JP 2006-333180 A discussed above, meanwhile, the band of a broadcast signal is scanned, and the vehicle is considered to be located outside the service area of the broadcast signal in the case where a reception frequency of the broadcast signal is not obtained. However, there may be an area in which a reception frequency is not obtained through scanning even in the service area of the broadcast signal. For example, a broadcast signal may not be received on a road around which a three-dimensional structure is present even in the service area. Thus, the current location cannot be specified accurately in the related art in the case where the current location falls in an area in which a reception frequency is not obtained.

Exemplary embodiments of the inventive principles described herein have been made in view of the foregoing issue, and therefore have an object to provide a technology that can improve the accuracy of specifying the current location.

In order to achieve the foregoing object, there is provided a navigation system including: signal reception means for receiving a first signal and a second signal that is different from the first signal; and region estimation means for estimating a region in which a current location is present on the basis of a combination of a status of reception of the first signal and a status of reception of the second signal. As a result, the accuracy of specifying the current location can be improved compared to the related art.

Further, the signal reception means may include: GPS signal reception means for receiving a GPS signal as the first signal; and broadcast signal reception means for receiving a broadcast signal as the second signal. That is, the GPS signal and the broadcast signal are different from each other in characteristics, position from which the signal is transmitted, intensity of the transmitted signal, etc., and therefore there may occur a situation in which the status of reception of one of the signals is poor and the status of reception of the other signal is good at the same position. In some cases, the broadcast signal is sent into a closed space such as an in-tunnel road by a relay. Further, there rarely occurs a situation in which the GPS signal cannot be received because of being distant from a GPS satellite, and therefore there may occur a situation in which the GPS signal can be received at a location at which the broadcast signal cannot be received because of being distant from the sender of the broadcast signal. Thus, a region in which the current location is present can be estimated by analyzing the combination of the status of reception of the GPS signal and the status of reception of the broadcast signal. As a result, the accuracy of specifying the current location can be improved.

Here, it is only necessary that the GPS signal reception means should be able to receive a GPS signal transmitted from a GPS satellite. That is, it is only necessary that the GPS signal reception means should include a communication section that can acquire GPS signals transmitted from a plurality of GPS satellites in order to specify the current location on the basis of the GPS signals. It is only necessary that the broadcast signal reception means should be able to receive a broadcast signal. That is, it is only necessary that the broadcast signal reception means should include a communication section that can acquire a broadcast signal transmitted from one or more senders (including relay stations) in order to reproduce broadcast based on the broadcast signal.

It is only necessary that the region estimation means should be able to estimate a region in which the current location is present on the basis of the combination of the status of reception of the GPS signal and the status of reception of the broadcast signal. That is, in the navigation system, the current location is specified through a comprehensive judgment made in accordance with various judgment criteria such as a vehicle speed sensor, a gyro sensor, and the GPS signal. Here, however, it is only necessary that the region estimation means should be able to estimate a region in which the current location is present on the basis of the combination of the status of reception of the GPS signal and the status of reception of the broadcast signal and use such an estimation as judgment criteria for specifying the current location. A region is a range in which the current location may be present, and can be defined in a variety of modes. For example, locations on roads and in facilities at which the navigation system may be present may be a region in which the current location is present.

For example, the region estimation means may specify a candidate region in which the current location may be present on the basis of a combination of a status of reception of the GPS signal and a status of reception of the broadcast signal, and relatively increase a probability at which the current location is estimated to be present in the candidate region. The region estimation means estimates a region in which the current location is present by specifying a region in which the current location is present at a high probability with reference to other factors such as a track of movement of the navigation system specified by various types of sensors. As a matter of course, the configuration described above is substantially equivalent to a configuration in which a region in which the current location may not be present is specified on the basis of the combination of the status of reception of the GPS signal and the status of reception of the broadcast signal and the probability at which the current location is estimated to be present in such a region is relatively reduced.

It is only necessary that the status of reception should be defined to be better as the probability at which information superimposed on the GPS signal or the broadcast signal can be recovered correctly is higher and the amount of information that can be recovered correctly is larger. Thus, the status of reception may be defined to be better as the signal intensity is higher, the status of reception may be defined to be better as the communication quality (such as the C/N ratio, the S/N ratio, the modulation error ratio, and the bit error rate) is higher, or the status of reception may be considered to be good in the case where a parameter (e.g. gain) for signal demodulation etc. indicates a high communication quality.

In any case, it is only necessary that whether the status of reception is good or poor and the degree to which the status of reception is good or poor should be defined such that a region in which the current location is present at a high probability or a region in which the current location is present at a low probability can be specified in accordance with the combination of the status of reception of the GPS signal and the status of reception of the broadcast signal. It is only necessary that a region in which the current location is present at a high probability or a region in which the current location is present at a low probability should be correlated in advance with a combination of the status of reception of the GPS signal and the status of reception of the broadcast signal. For example, a road that is present on the earth's surface may be specified as a candidate region in the case where the status of reception of the GPS signal is poorer than a predetermined criterion and the status of reception of the broadcast signal is better than a predetermined criterion.

That is, the status of reception of the GPS signal may become poor on roads that are present on the earth's surface such as a road between high-rise buildings and a road under an elevated road, and the status of reception of the broadcast signal rarely becomes poor on such roads that are present on the earth's surface and within the range of reception of the broadcast signal. Thus, the current location can be considered to be present on a road that is present on the earth's surface at a high probability in the case where the status of reception of the GPS signal is poorer than the predetermined criterion and the status of reception of the broadcast signal is better than the predetermined criterion. Here, roads that are present on the earth's surface include roads that are present on the ground surface, and do not include roads that are present under the earth's surface, e.g. an underground road and an in-tunnel road.

It is only necessary that the predetermined criterion should be set such that a region in which the current location is present at a high probability or a region in which the current location is present at a low probability can be specified in accordance with the combination of a status of reception that is better than the predetermined criterion and a status of reception that is poorer than the predetermined criterion. In addition, the predetermined criterion may be a criterion for directly evaluating the status of reception, or may be a criterion for indirectly evaluating the status of reception. For the former, for example, a threshold may be set for the signal intensity, a value that indicates the communication quality, a parameter for signal demodulation, etc., which are indices for evaluating the status of reception, and the threshold may be compared with the signal intensity, the value that indicates the communication quality, the parameter for signal demodulation, etc. to evaluate whether or not the status of reception is poorer than the predetermined criterion. For the latter, for example, a threshold may be set for the reliability of the current location obtained in accordance with the GPS signal or an index that indicates whether or not the broadcast content can be demodulated in accordance with the broadcast signal (such as the degree of noise contained in a broadcast audio or a broadcast image), and the threshold may be compared with the reliability or the index to evaluate whether or not the status of reception is poorer than the predetermined criterion.

In the configuration described above, underground roads and in-tunnel roads are excluded from roads that are present on the earth's surface. However, exceptions may be provided. For example, in the case where the status of reception of the GPS signal is poorer than the predetermined criterion, the status of reception of the broadcast signal is better than the predetermined criterion, and there is a road which is present under the earth's surface and on which a broadcast signal can be received within the range of a predetermined distance from the current location specified on the basis of the GPS signal, such a road may be specified as a candidate region.

That is, for roads that are present under the earth's surface, a relay may be provided inside or around such roads to improve the status of reception of the broadcast signal on the roads that are present under the earth's surface. Thus, if the roads that are present under the earth's surface are not excluded from a candidate region in such cases, it is possible to accurately estimate a region in which the current location is present.

Further, a road that is present under an earth's surface may be specified as the candidate region in the case where the status of reception of the GPS signal is poorer than a predetermined criterion and the status of reception of the broadcast signal is poorer than a predetermined criterion. That is, both the status of reception of the GPS signal and the status of reception of the broadcast signal often become poor on roads that are present under the earth's surface such as an underground road and an in-tunnel road. Thus, the current location can be considered to be present on a road that is present under the earth's surface at a high probability in the case where the status of reception of the GPS signal is poorer than the predetermined criterion and the status of reception of the broadcast signal is poorer than the predetermined criterion.

Further, a road that is present in a remote area may be specified as the candidate region in the case where the status of reception of the GPS signal is better than a predetermined criterion and the status of reception of the broadcast signal is poorer than a predetermined criterion. That is, the status of reception of the GPS signal is often good even at suburban locations which are distant from the sender of the broadcast signal and at which the status of reception of the broadcast signal is poor. Thus, if such locations are defined in advance as remote areas, the current location can be considered to be present on a road that is present in a remote area at a high probability in the case where the status of reception of the GPS signal is better than the predetermined criterion and the status of reception of the broadcast signal is poorer than the predetermined criterion.

Further, at many locations at which reception of the GPS signal is not obstructed and reception of the broadcast signal is not obstructed, the status of reception of the GPS signal is better than the predetermined criterion, and the status of reception of the broadcast signal is better than the predetermined criterion. However, in the case where the current location is present on an elevated road, in particular, the status of reception of the GPS signal is rarely poorer than the predetermined criterion, and the status of reception of the broadcast signal is also rarely poorer than the predetermined criterion. Thus, an elevated road may be determined as a candidate region in the case where the status of reception of the GPS signal is better than the predetermined criterion and the status of reception of the broadcast signal is better than the predetermined criterion, which reduces the probability at which the current location is erroneously estimated to be present on another road even through the current location is present on an elevated road.

Further, the signal reception means may receive a first broadcast signal which is a radio wave in a first frequency band and a second broadcast signal which is a radio wave in a second frequency band that is higher in frequency than the first frequency band.

That is, broadcast signals are transmitted in accordance with various types of communication scheme, and there may occur a situation in which broadcast signals according to different schemes that utilize radio waves in different frequency bands are transmitted in the same region. Then, when broadcast signals in different frequency bands are compared with each other, the broadcast signals differ from each other in straight-travel property, reflection property, degree of diffraction, etc. because of a difference in frequency (or wavelength) or modulation scheme, and therefore there may be a difference in status of reception in the same region.

For example, the distance that a broadcast signal may reach and the degree to which a broadcast signal enters a building differ in accordance with the frequency. The AM radio broadcast signal broadcast in Japan may be received in a wide region compared to the FM radio broadcast signal. In a three-dimensional structure, however, the FM radio broadcast signal is easily received compared to the AM radio broadcast signal. Thus, a certain location can be estimated by analyzing the status of reception of radio waves at the location. Thus, a region in which the current location is present can be estimated by analyzing the combination of the status of reception of the first broadcast signal and the status of reception of the second broadcast signal. As a result, the accuracy of specifying the current location can be improved.

Here, it is only necessary that the broadcast signal reception means should be able to receive a first broadcast signal which is a radio wave in a first frequency band and a second broadcast signal which is a radio wave in a second frequency band that is higher in frequency than the first frequency band. That is, it is only necessary that the broadcast signal reception means should be able to receive broadcast signals in different frequency bands. It is only necessary that the first broadcast signal and the second broadcast signal should differ from each other in at least the frequency band of radio waves, and that the first broadcast signal and the second broadcast signal should be distinguished from each other such that a region in which the current location is present can be estimated from the combination of the status of reception of the first broadcast signal and the status of reception of the second broadcast signal because of the difference in frequency band.

In addition, the first broadcast signal and the second broadcast signal may be different from or identical to each other in elements other than the frequency band such as the modulation scheme and the information expression mode (analog or digital), for example. In addition, it is only necessary that the first broadcast signal and the second broadcast signal should be broadcast signals transmitted from one or more senders (including relay stations), and transmitted signals broadcast in different channels in order to distinguish signals from different senders may be received.

It is only necessary that the region estimation means should be able to estimate a region in which the current location is present on the basis of the combination of the status of reception of the first broadcast signal and the status of reception of the second broadcast signal. That is, in the navigation system, the current location is specified through a comprehensive judgment made in accordance with various judgment criteria such as a vehicle speed sensor, a gyro sensor, and the GPS signal. Here, however, it is only necessary that the region estimation means should be able to estimate a region in which the current location is present on the basis of the combination of the status of reception of the first broadcast signal and the status of reception of the second broadcast signal and use such an estimation as judgment criteria for specifying the current location. A region is a range in which the current location may be present, and can be defined in a variety of modes. For example, locations on roads and in facilities at which the navigation system may be present may be a region in which the current location is present.

For example, the region estimation means may specify a candidate region in which the current location may be present on the basis of a combination of a status of reception of the first broadcast signal and a status of reception of the second broadcast signal, and relatively increase a probability at which the current location is estimated to be present in the candidate region. The region estimation means estimates a region in which the current location is present by specifying a region in which the current location is present at a high probability with reference to other factors such as a track of movement of the navigation system specified by various types of sensors. As a matter of course, the configuration described above is substantially equivalent to a configuration in which a region in which the current location may not be present is specified on the basis of the combination of the status of reception of the first broadcast signal and the status of reception of the second broadcast signal and the probability at which the current location is estimated to be present in such a region is relatively reduced.

It is only necessary that the status of reception should be defined to be better as the probability at which information superimposed on the first broadcast signal or the second broadcast signal can be recovered correctly is higher and the amount of information that can be recovered correctly is larger. Thus, the status of reception may be defined to be better as the signal intensity is higher, the status of reception may be defined to be better as the communication quality (such as the C/N ratio, the S/N ratio, the modulation error ratio, and the bit error rate) is higher, or the status of reception may be considered to be good in the case where a parameter (e.g. gain) for signal demodulation etc. indicates a high communication quality.

In any case, it is only necessary that whether the status of reception is good or poor and the degree to which the status of reception is good or poor should be defined such that a region in which the current location is present at a high probability or a region in which the current location is present at a low probability can be specified in accordance with the combination of the status of reception of the first broadcast signal and the status of reception of the second broadcast signal. It is only necessary that a region in which the current location is present at a high probability or a region in which the current location is present at a low probability should be correlated in advance with a combination of the status of reception of the first broadcast signal and the status of reception of the second broadcast signal. For example, a road around which a three-dimensional structure is present may be specified as a candidate region in the case where the degree of degradation of the status of reception of the first broadcast signal compared to a reference status of reception is larger than a predetermined degree and the degree of degradation of the status of reception of the second broadcast signal compared to a reference status of reception is smaller than a predetermined degree.

That is, a broadcast signal in a band at high frequencies (with short wavelengths) easily enters a structure through diffraction compared to a broadcast signal in a band at low frequencies (with long wavelengths). Thus, on roads around which a three-dimensional structure is present such as an aboveground multi-level parking lot which is surrounded by walls that lead to the outside, the statuses of reception of the broadcast signals are poorer than on outdoor roads, but the status of reception of the second broadcast signal at a relatively high frequency is often better than the status of reception of the first broadcast signal. Thus, the current location can be considered to be present on a road around which a three-dimensional structure is present at a high probability in the case where the degree of degradation of the status of reception of the first broadcast signal compared to the reference status of reception is larger than the predetermined degree and the degree of degradation of the status of reception of the second broadcast signal compared to the reference status of reception is smaller than the predetermined degree. Here, it is only necessary that the road around which a three-dimensional structure is present should be a road for which there is a difference between the status of reception of the first broadcast signal and the status of reception of the second broadcast signal, and the road around which a three-dimensional structure is present may be an aboveground multi-level parking lot which is surrounded by walls that lead to the outside and a road under an elevated road.

In addition, it is only necessary that the reference status of reception should be an index for judging whether or not the status of reception of the first broadcast signal or the status of reception of the second broadcast signal has been degraded. For example, a normal status of reception of the first broadcast signal while the vehicle is traveling on an aboveground road with few blocking objects or while the broadcast content is reproduced appropriately may be defined as the reference status of reception for the first broadcast signal, and a normal status of reception of the second broadcast signal in such a state may be defined as the reference status of reception for the second broadcast signal. As a matter of course, the reference status of reception can be specified at various timings. The status of reception in the case where the current location is estimated to be present on an aboveground road with few blocking objects may be defined as the reference status of reception. Alternatively, in the case where the status of reception is degraded, the status of reception before the degradation may be defined as the reference status of reception.

Further, the degree of degradation compared to the reference status of reception may be evaluated by a relative value, or may be evaluated by an absolute value. Examples of the former include (value indicating the status of reception as a result of the degradation)/(value indicating the reference status of reception), and examples of the latter include (value indicating the reference status of reception)–(value indicating the status of reception as a result of the degradation).

Further, it is only necessary that a predetermined degree for evaluating the degree of degradation should be defined such that a region in which the current location is present can be estimated as a result of determining whether or not the degree of degradation of the statuses of reception of the first broadcast signal and the second broadcast signal compared to the reference status of reception is larger than the predetermined degree. Thus, the predetermined degree may be set by statistically setting a measured value of the predetermined degree or estimating the predetermined degree such that the current location can be estimated correctly with certain likelihood or more in accordance with the combination of the statuses of reception which have been classified in accordance with the predetermined degree.

Further, a road that is present under an earth's surface may be specified as the candidate region in the case where a degree of degradation of the status of reception of the first broadcast signal compared to a reference status of reception is larger than a predetermined degree and a degree of degradation of the status of reception of the second broadcast signal compared to a reference status of reception is larger than a predetermined degree. That is, on roads that are present under the earth's surface such as an underground road and an in-tunnel road, it is difficult to receive the broadcast signals unless a relay is provided. Thus, the current location can be considered to be present on a road that is present under the earth's surface at a high probability in the case where the degree of degradation of the status of reception of the first broadcast signal compared to the reference status of reception is larger than the predetermined degree and the degree of degradation of the status of reception of the second broadcast signal compared to the reference status of reception is larger than the predetermined degree.

Further, a road that is present in a remote area may be specified as the candidate region in the case where a degree of degradation of the status of reception of the first broadcast signal compared to a reference status of reception is smaller than a predetermined degree and a degree of degradation of the status of reception of the second broadcast signal compared to a reference status of reception is larger than a predetermined degree. That is, a situation in which the first broadcast signal at a relatively low frequency (with long wavelengths) reaches distant locations compared to the second broadcast signal at a relatively high frequency (with short wavelengths) may occur in practice. For example, the AM radio broadcast signal broadcast in Japan tends to reach distant locations compared to the FM radio broadcast signal. Thus, if such locations are defined in advance as remote areas, the current location can be considered to be present on a road that is present in a remote area at a high probability in the case where the degree of degradation of the status of reception of the first broadcast signal compared to the reference status of reception is smaller than the predetermined degree and the degree of degradation of the status of reception of the second broadcast signal compared to the reference status of reception is larger than the predetermined degree.

Further, the technique for estimating a region in which the current location is present on the basis of the combination of the status of reception of the first signal and the status of reception of the second signal may also be applied as a program and a method. In addition, it can be assumed that the system, program, and method described above are implemented as a single device, implemented by a plurality of devices, or implemented utilizing parts that are common to various portions provided in the vehicle, and the system, program, and method include a variety of aspects. For example, a navigation system, method, and program that includes the means described above can be provided. Various changes may be made. For example, some units may be implemented using software, and the others may be implemented using hardware. Further, the inventive principles described herein may be implemented as a storage medium for a program that controls the system. (As used herein, the term "storage medium" is not intended to encompass transitory signals.) As a matter of course, the storage medium for the software may totally equally be a magnetic storage medium, a magneto-optical storage medium, or any storage medium that may be developed in the future.

BRIEF DESCRIPTION OF THE DRAWINGS

FIG. 4 is a flowchart illustrating a current location specifying process according to the second embodiment.

EXEMPLARY EMBODIMENTS

Figure 1:
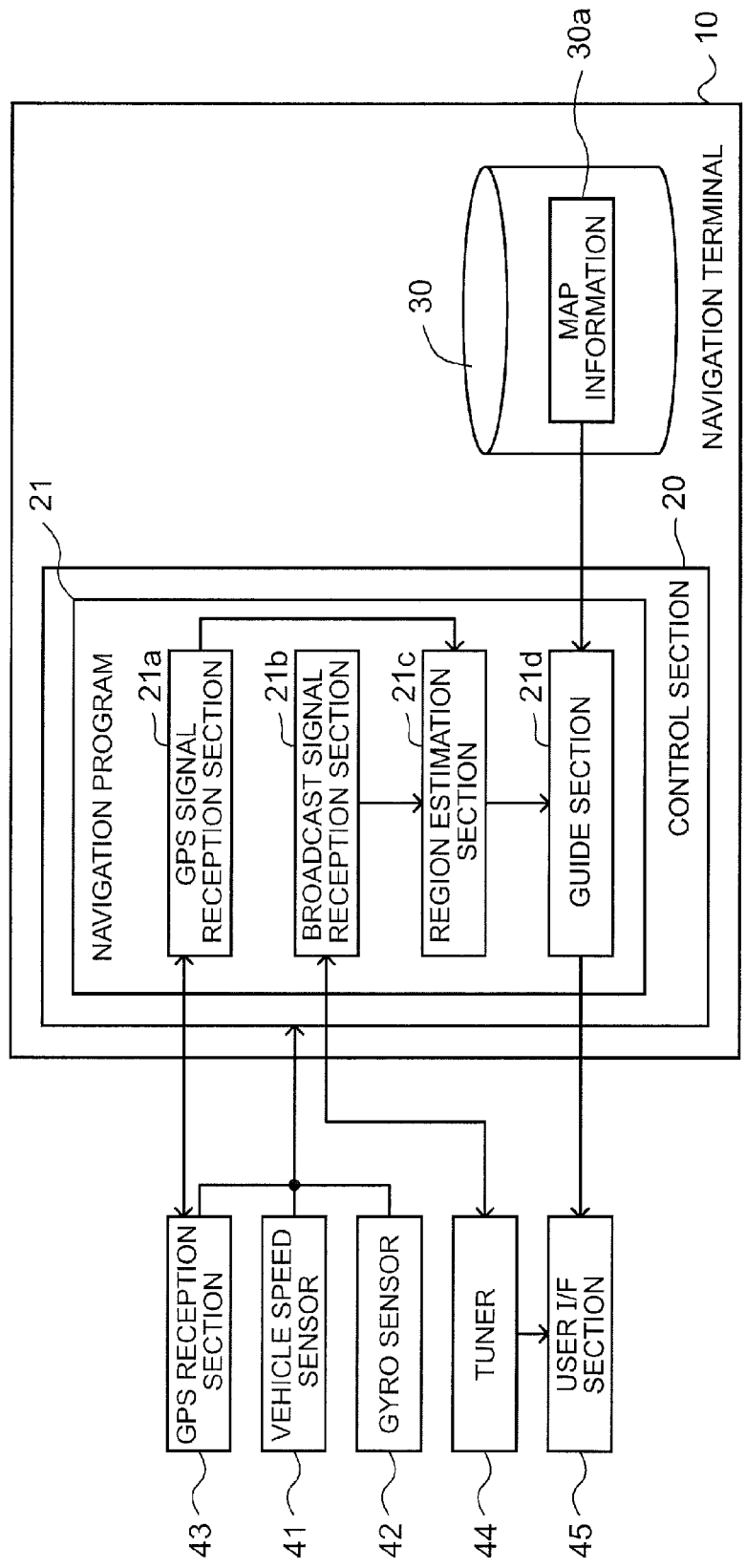
FIG. 1 is a block diagram illustrating a navigation terminal according to a first embodiment.

Embodiments will be described below in the following order:
(1) First Embodiment
(1-1) Configuration of Navigation Terminal
(1-2) Current Location Specifying Process
(2) Second Embodiment
(2-1) Configuration of Navigation Terminal
(2-2) Current Location Specifying Process
(3) Other Embodiments
  (1) Configuration of Navigation Terminal
FIG. 1 is a block diagram illustrating the configuration of a navigation system mounted on a vehicle. In the embodiment, the navigation system is implemented by a navigation terminal 10. The navigation terminal 10 includes a control section 20 including a CPU, a RAM, a ROM, and so forth. The control section 20 can execute programs stored in the ROM. In the embodiment, a navigation program 21 can be executed as one of the programs. The navigation program 21 can cause the control section 20 to execute a function of performing a map matching process on the basis of autonomous navigation information to specify the current location of the navigation terminal 10 on a road and display the current location on a map. Further, the navigation program 21 according to the embodiment can cause the control section 20 to execute a function of improving the accuracy of specifying the current location. In order to implement such functions, the navigation program 21 includes a GPS signal reception section 21a, a broadcast signal reception section 21b, a region estimation section 21c, and a guide section 21d.

A storage medium 30 stores map information 30a in advance. The map information 30a is information utilized to specify the current location or the like, and includes node data indicating the positions of nodes set on roads on which the vehicle travels, shape interpolation point data for specifying the shape of the roads between the nodes, link data indicating coupling between the nodes, feature data indicating the positions and the types of features existing on or around the roads, and so forth. In addition, the link data according to the embodiment are correlated with attribute information on the roads indicated by the link data. That is, an underground road is correlated with information indicating that the road is an underground road, a road in an underground parking lot is correlated with information indicating that the road is a road in an underground parking lot, and an in-tunnel road on which a broadcast signal cannot be received is correlated with information indicating that the road is an in-tunnel road on which a broadcast signal cannot be received. In addition, a road between high-rise buildings is correlated with information indicating that the road is a road between high-rise buildings, a road under an elevated road is correlated with information indicating that the road is a road under an elevated road, an in-tunnel road on which a broadcast signal can be received is correlated with information indicating that the road is an in-tunnel road on which a broadcast signal can be received, and a road in an aboveground multi-level parking lot is correlated with information indicating that the road is a road in an aboveground multi-level parking lot. Further, a road that is present in a remote area is correlated with information indicating that the road is a road that is present in a remote area. Furthermore, an elevated road is correlated with information indicating that the road is a road above an elevated road, and a road in an urban area that commands a fine view is correlated with information indicating that the road is a road in an urban area that commands a fine view.

The vehicle on which the navigation terminal 10 is mounted includes a vehicle speed sensor 41, a gyro sensor 42, a GPS reception section 43, a tuner 44, and a user I/F section 45. The vehicle speed sensor 41 outputs a signal corresponding to the rotational speed of wheels of the vehicle. The gyro sensor 42 outputs a signal corresponding to the angular speed acting on the vehicle. The control section 20 acquires information output from the vehicle speed sensor 41 and the gyro sensor 42 as autonomous navigation information, and acquires an autonomous navigation track which is a track of the vehicle indicated by the autonomous navigation information in the chronological order.

The GPS reception section 43 is a communication section that acquires GPS signals transmitted from a plurality of GPS satellites. The control section 20 controls the GPS reception section 43 through processing performed by the GPS signal reception section 21a so as to receive the GPS signals transmitted from the GPS satellites. In the embodiment, in addition, the GPS reception section 43 outputs to the control section 20 a signal that indicates the communication quality (such as the C/N ratio) which corresponds to the status of reception of the GPS signals. The control section 20 receives the signal which indicates the communication quality through processing performed by the GPS signal reception section 21a to specify the communication quality. The communication quality and the GPS signals are referenced in processing performed by the region estimation section 21c.

The tuner 44 is a communication section that acquires a broadcast signal (in the embodiment, a radio broadcast signal) transmitted from one or more senders (including relay stations) in order to reproduce broadcast based on the broadcast signal. The control section 20 controls the tuner 44 through processing performed by the broadcast signal reception section 21b so as to demodulate the broadcast signal from the plurality of senders. The signal demodulated by the tuner 44 is output to a speaker of the user I/F section 45. In the embodiment, in addition, the tuner 44 outputs to the control section 20 a signal that indicates the communication quality (such as the C/N ratio in the embodiment) which corresponds to the status of reception of the broadcast signal. The control section 20 receives the signal which indicates the communication quality through processing performed by the broadcast signal reception section 21b to specify the communication quality. The communication quality is referenced in processing performed by the region estimation section 21c.

The user I/F section 45 is an interface section that receives input of a command from a driver and that provides various kinds of information to the driver, and includes a display section that also serves as an input section constituted of a touch panel display (not illustrated), and an output section for output sound such as a speaker. The user I/F section 45 receives a control signal from the control section 20, displays an image for providing various types of guidance on the touch panel display, and outputs output sound for providing various types of guidance from the speaker. In addition, the user I/F section 45 transmits a signal that indicates the content input via the touch panel to the control section 20, and the control section 20 specifies the content of an operation performed by the user on the basis of such a signal. In addition, the speaker receives a demodulated signal from the tuner 44, and outputs sound which is the content of broadcast based on the broadcast signal.

The region estimation section 21c is a program module that causes the control section 20 to execute a function of specifying the current location of the navigation terminal 10. In the embodiment, when specifying the current location, the region estimation section 21c causes the control section 20 to execute a function of estimating a region in which the current location is present on the basis of a combination of the status of reception of the GPS signals and the status of reception of the broadcast signal. In the embodiment, the region in which the current location is present is a road, and therefore a candidate region in which the current location may be present is called a candidate road.

That is, the control section 20 sets a plurality of comparison target roads, on which the current location of the vehicle may be present, on the basis of the autonomous navigation information which is information output from the vehicle speed sensor 41 and the gyro sensor 42 and the map information 30a through processing performed by the region estimation section 21c, narrows down the comparison target roads on the basis of an error circle of the GPS signals acquired by the GPS reception section 43, performs a map matching process in which the road for which the shape of the comparison target road and the autonomous navigation track best match each other is considered as the road on which the vehicle is traveling, and specifies the current location on the road specified through the map matching process.

In the embodiment, further, the accuracy of specifying the current location is improved by adjusting the probability at which the specified candidate road is the road on which the current location is present on the basis of the status of reception of the GPS signals and the broadcast signal. That is, the GPS signal and the broadcast signal are different from each other in characteristics, position from which the signal is transmitted, intensity of the transmitted signal, etc., and therefore there may occur a situation in which the status of reception of one of the signals is poor and the status of reception of the other is good at the same position. In some cases, the broadcast signal is sent into a closed space such as an in-tunnel road by a relay. Further, there may occur a situation in which the broadcast signal cannot be received because of being distant from the sender of the broadcast signal, for example, but the GPS signal can be received. Thus, a region in which the current location is present can be estimated by analyzing the combination of the status of reception of the GPS signal and the status of reception of the broadcast signal. As a result, the accuracy of specifying the current location can be improved.

Specifically, the control section 20 specifies candidate roads on which the current location may be present from comparison target roads within the error circle on the basis of the combination of the status of reception of the GPS signals and the status of reception of the broadcast signal through processing performed by the region estimation section 21c, and relatively increases the probability at which the current location is estimated to be present on the specified candidate roads compared to the other comparison target roads. Here, as a matter of course, roads on which the current location may not be present may be specified on the basis of the combination of the status of reception of the GPS signals and the status of reception of the broadcast signal, and the probability at which the current location is estimated to be present on such roads may be relatively reduced.

In the embodiment, whether the status of reception is good or poor and the degree to which the status of reception is good or poor have been defined in advance such that roads on which the current location is present at a high probability or roads on which the current location is present at a low probability can be specified in accordance with the combination of the status of reception of the GPS signals and the status of reception of the broadcast signal. That is, a predetermined criterion to be compared with the communication quality acquired through processing performed by the GPS signal reception section 21a has been defined in advance. Then, the control section 20 determines that the status of reception is poor in the case where the communication quality acquired through processing performed by the GPS signal reception section 21a is lower than the predetermined criterion and the status of reception is good in the case where the communication quality is higher than the predetermined criterion. Similarly, a predetermined criterion to be compared with the communication quality acquired through processing performed by the broadcast signal reception section 21b has been defined in advance. Then, the control section 20 determines that the status of reception is poor in the case where the communication quality acquired through processing performed by the broadcast signal reception section 21b is lower than the predetermined criterion and the status of reception is good in the case where the communication quality is higher than the predetermined criterion.

More specifically, the status of reception is considered to be good in the case where the C/N which indicates the communication quality is more than a predetermined threshold, and the status of reception is determined to be poor in the case where the C/N is less than the predetermined threshold. Here, as a matter of course, it is only necessary that the threshold which serves as the predetermined criterion should be set such that roads on which the current location is present at a high probability or roads on which the current location is present at a low probability can be specified in accordance with the combination of the status of reception which is better than the predetermined criterion and the status of reception which is poorer than the predetermined criterion, and the predetermined criterion may be the same criterion or different criteria for the GPS signal and the broadcast signal.

It is only necessary that roads on which the current location is present at a high probability or roads on which the current location is present at a low probability should be correlated in advance with a combination of the status of reception of the GPS signals and the status of reception of the broadcast signal. For example, correlation illustrated in Table 1 may be assumed.

TABLE 1

| Broadcast | GPS | |
| --- | --- | --- |
| | Reception status: good | Reception status: poor |
| Reception status: good | Elevated road<br>Road in urban area that commands fine view | Road between high-rise buildings<br>Road under elevated road<br>Tunnel in which broadcast signal can be received<br>Road in aboveground multi-level parking lot (or region in aboveground multi-level parking lot) |
| Reception status: poor | Road in remote area | Underground road<br>Road in underground parking lot (or region in underground parking lot)<br>Tunnel in which broadcast signal cannot be received |

Specifically, the status of reception of the GPS signals may become poor on roads that are present on the earth's surface such as a road between high-rise buildings and a road under an elevated road, and the status of reception of the broadcast signal rarely becomes poor on such roads that are present on the earth's surface and within the range of reception of the broadcast signal. Thus, in the case where the status of reception of the GPS signals is poorer than the predetermined criterion and the status of reception of the broadcast signal is better than the predetermined criterion, roads that are present on the earth's surface such as a road between high-rise buildings and a road under an elevated road may be specified as candidate roads such that the current location is considered to be present on a road that is present on the earth's surface at a high probability.

Here, roads that are present on the earth's surface include roads that are present on the ground surface, and do not include roads that are present under the earth's surface, e.g. an underground road and an in-tunnel road. However, exceptions may be provided. For example, in the case where the status of reception of the GPS signals is poorer than the predetermined criterion, the status of reception of the broadcast signal is better than the predetermined criterion, and there is a road which is present under the earth's surface and on which a broadcast signal can be received within the range of a predetermined distance from the current location specified on the basis of the GPS signals, the control section 20 may specify such a road as a candidate road.

That is, for roads that are present under the earth's surface, a relay may be provided inside or around such roads to improve the status of reception of the broadcast signal on the roads that are present under the earth's surface. Thus, if the roads that are present under the earth's surface are not excluded from candidate roads in such cases, it is possible to accurately estimate a road on which the current location is present. In Table 1, a tunnel in which the broadcast signal can be received is indicated as an example of roads under the earth's surface on which the current location may be present in the case where the status of reception of the GPS signals is poorer than the predetermined criterion and the status of reception of the broadcast signal is better than the predetermined criterion.

A situation in which the status of reception of the GPS signals is poorer than the predetermined criterion and the status of reception of the broadcast signal is better than the predetermined criterion may be assumed on a road that is in an aboveground multi-level parking lot and that is not in a closed space. For example, on a road in an aboveground multi-level parking lot indicated in Table 1, the status of reception of the GPS signals may be poorer than the predetermined criterion, and the status of reception of the broadcast signal may be better than the predetermined criterion.

Further, both the status of reception of the GPS signals and the status of reception of the broadcast signal often become poor on roads that are present under the earth's surface such as an underground road, a road in an underground parking lot, and an in-tunnel road on which a broadcast signal cannot be received. Thus, in the case where the status of reception of the GPS signals is poorer than the predetermined criterion and the status of reception of the broadcast signal is poorer than the predetermined criterion, roads that are present under the earth's surface may be specified as candidate roads such that the current location is considered to be present on a road that is present under the earth's surface at a high probability.

Further, the status of reception of the GPS signals is often good even at suburban locations which are distant from the sender of the broadcast signal and at which the status of reception of the broadcast signal is poor. Thus, such locations may be defined in advance as remote areas, and in the case where the status of reception of the GPS signals is better than the predetermined criterion and the status of reception of the broadcast signal is poorer than the predetermined criterion, roads that are present in a remote area may be specified as candidate roads such that the current location is considered to be present on a road that is present in a remote area at a high probability.

Further, at many locations at which reception of the GPS signals is not obstructed and reception of the broadcast signal is not obstructed, the status of reception of the GPS signals is better than the predetermined criterion, and the status of reception of the broadcast signal is better than the predetermined criterion. However, in the case where the current location is present on an elevated road, in particular, the status of reception of the GPS signals is rarely poorer than the predetermined criterion, and the status of reception of the broadcast signal is also rarely poorer than the predetermined criterion. Thus, an elevated road may be determined as a candidate road in the case where the status of reception of the GPS signals is better than the predetermined criterion and the status of reception of the broadcast signal is better than the predetermined criterion. According to the configuration, it is possible to suppress the probability at which the current location is erroneously estimated to be present on a wrong road even though the current location is present on an elevated road. As a matter of course, a road in an urban area that commands a fine view may be determined as a candidate road in the case where the status of reception of the GPS signals is better than the predetermined criterion and the status of reception of the broadcast signal is better than the predetermined criterion.

As has been described above, roads on which the current location is present at a high probability or roads on which the current location is present at a low probability can be specified in accordance with the combination of the status of reception of the GPS signals and the status of reception of the broadcast signal. Thus, the control section 20 can improve the accuracy of specifying the current location by adjusting the probability at which the current location is estimated to be present on a candidate road in accordance with the combination of the status of reception of the GPS signals and the status of reception of the broadcast signal in the case where each road indicated in Table 1 is determined as the candidate road.

(2) Current Location Specifying Process

Figure 2:
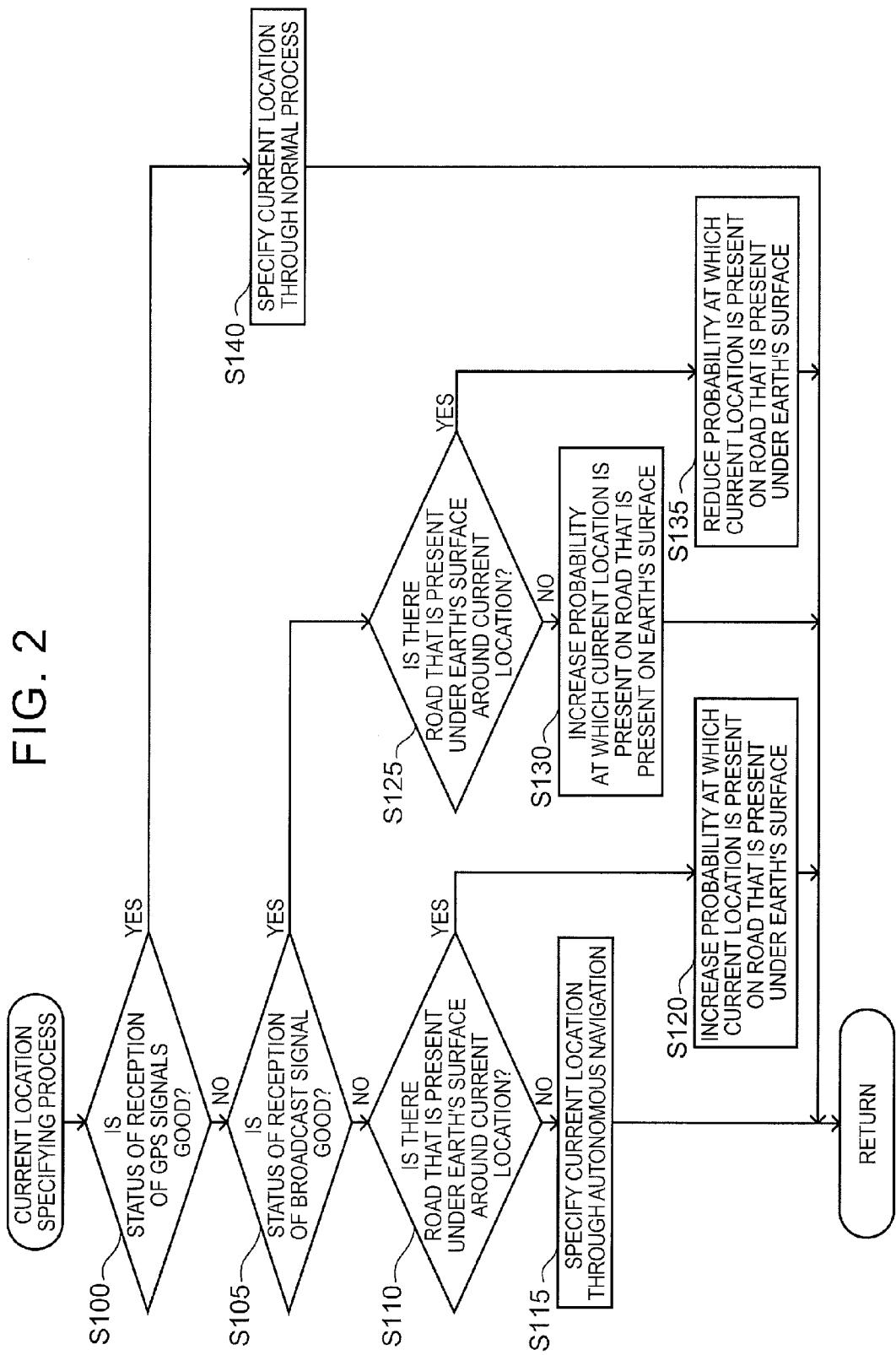
FIG. 2 is a flowchart illustrating a current location specifying process according to the first embodiment.

Next, an example of a current location specifying process will be described in detail. FIG. 2 is a flowchart of a current location specifying process in which the probability at which the candidate road is estimated to be the road on which the current location is present is adjusted in the case where the status of reception of the GPS signals is poor and the status of reception of the broadcast signal is good and in the case where the status of reception of the GPS signals is poor and the status of reception of the broadcast signal is poor. In the embodiment, when the navigation program 21 is executed, the control section 20 executes a process for displaying a map on the display section of the user I/F section 45 through processing performed by the guide section 21*d*. That is, the control section 20 outputs to the user I/F section 45 a control signal for depicting a map of the periphery of the current location of the vehicle and the current location of the vehicle on the basis of the map information 30*a*. As a result, a map of the periphery of the current location of the vehicle and the current location of the vehicle are depicted on the display section of the user I/F section 45.

In order to acquire or update the current location while the display section of the user I/F section 45 is displaying such display, the control section 20 executes the current location specifying process at intervals of a predetermined period (e.g. 100 ms). In the current location specifying process illustrated in FIG. 2, the control section 20 determines whether or not the status of reception of the GPS signals is good through processing performed by the GPS signal reception section 21*a* and the region estimation section 21*c* (step S100). That is, the control section 20 acquires the communication quality which corresponds to the status of reception of the GPS signals through processing performed by the GPS signal reception section 21*a*, compares the communication quality with a threshold through processing performed by the region estimation section 21*c*, and determines that the status of reception is good in the case where the communication quality is higher than the threshold.

In the case where it is determined in step S100 that the status of reception of the GPS signals is good, the control section 20 specifies the current location through a normal process (step S140). That is, through processing performed by the navigation program 21, the control section 20 acquires information output from the vehicle speed sensor 41 and the gyro sensor 42 as autonomous navigation information, and acquires an autonomous navigation track which is a track of the vehicle indicated by the autonomous navigation information in the chronological order. In addition, the control section 20 sets a plurality of comparison target roads on which the current location of the vehicle may be present on the basis of the autonomous navigation track and the map information 30*a*, and narrows down the comparison target roads on the basis of an error circle of the GPS signals acquired by the GPS reception section 43. Further, the control section 20 performs a map matching process in which the road for which the shape of the comparison target road and the autonomous navigation track best match each other is considered as the road on which the vehicle is traveling, and specifies the current location on the road specified through the map matching process. In the example illustrated in FIG. 2, as has been described above, the current location is specified without adjusting the probability at which the candidate road is the road on which the current location is present on the basis of the status of reception in the case where the status of reception of the GPS signals is good.

In the case where it is not determined in step S100 that the status of reception of the GPS signals is good, the control section 20 determines, through processing performed by the broadcast signal reception section 21*b* and the region estimation section 21*c*, whether or not the status of reception of the broadcast signal is good (step S105). That is, the control section 20 acquires the communication quality which corresponds to the status of reception of the broadcast signal through processing performed by the broadcast signal reception section 21*b*, compares the communication quality with a threshold through processing performed by the region estimation section 21*c*, and determines that the status of reception is good in the case where the communication quality is higher than the threshold.

In the case where it is not determined in step S105 that the status of reception of the broadcast signal is good, both the status of reception of the GPS signals and the status of reception of the broadcast signal are poor, and therefore the current location is present on a road that is present under the earth's surface at a high probability. Thus, the control section 20 determines whether or not a road that is present under the earth's surface is present around the current location through processing performed by the region estimation section 21*c* (step S110). That is, the control section 20 references the map information 30*a*, and, within the error circle centered on the location which last recorded as the current location (the current location specified in the preceding current location specifying process), determines whether or not there is a road correlated with information indicating that the road is an underground road, a road correlated with information indicating that the road is a road in an underground parking lot, or a road correlated with information indicating that the road is an in-tunnel road on which a broadcast signal cannot be received. In the case where there is any such road, it is determined that a road that is present under the earth's surface is present around the current location.

Then, in the case where it is not determined in step S110 that a road that is present under the earth's surface is present around the current location, the result of the determination made in step S110 and the result of the determinations made in steps S100 and S105 contradict each other. Thus, the control section 20 determines that the reliability of the determination based on the GPS signals, the status of reception of which is poor, is low, and specifies the current location through autonomous navigation (step S115). That is, the control section 20 specifies the current location on the basis of the autonomous navigation information which is information output from the vehicle speed sensor 41 and the gyro sensor 42 through processing performed by the region estimation section 21c. In this case, the map matching process is not performed.

In the case where it is determined in step S110 that a road that is present under the earth's surface is present around the current location, on the other hand, the result of the determination made in step S110 and the result of the determinations made in steps S100 and S105 are consistent with each other. Thus, the control section 20 increases the probability at which the current location is present on the road that is present under the earth's surface (step S120). That is, through processing performed by the navigation program 21, the control section 20 acquires information output from the vehicle speed sensor 41 and the gyro sensor 42 as autonomous navigation information, and acquires an autonomous navigation track which is a track of the vehicle indicated by the autonomous navigation information in the chronological order. In addition, the control section 20 sets a plurality of comparison target roads on which the current location of the vehicle may be present on the basis of the autonomous navigation track and the map information 30a, and narrows down the comparison target roads on the basis of an error circle of the GPS signals acquired by the GPS reception section 43. In the case where a road that is present under the earth's surface is included in the comparison target roads, further, the control section 20 determines the road that is present under the earth's surface as a candidate road, and increases the probability at which the candidate road is estimated to be the road on which the current location is present. The process can be achieved by increasing an index indicating the degree of coincidence between the autonomous navigation track and the road shape of the candidate road by a certain proportion in the map matching process, for example. Then, the control section 20 performs the map matching process on the basis of the comparison target roads including the candidate road to specify the current location on the road specified through the map matching process.

In the case where it is determined in step S105 that the status of reception of the broadcast signal is good, the status of reception of the GPS signals is poor and the status of reception of the broadcast signal is good, and therefore the current location is present on a road that is present on the earth's surface (such as a road between high-rise buildings and a road under an elevated road), on which the status of reception of the GPS signals tends to be degraded, at a high probability. Thus, the control section 20 determines whether or not a road that is present under the earth's surface is present around the current location through processing performed by the region estimation section 21c (step S125).

Then, in the case where it is determined in step S125 that a road that is present under the earth's surface is present around the current location, the current location is present on the road that is present under the earth's surface at a low probability, and therefore the control section 20 reduces the probability at which the current location is present on the road that is present under the earth's surface (step S135). That is, through processing performed by the navigation program 21, the control section 20 acquires information output from the vehicle speed sensor 41 and the gyro sensor 42 as autonomous navigation information, and acquires an autonomous navigation track which is a track of the vehicle indicated by the autonomous navigation information in the chronological order. In addition, the control section 20 sets a plurality of comparison target roads on which the current location of the vehicle may be present on the basis of the autonomous navigation track and the map information 30a, and narrows down the comparison target roads on the basis of an error circle of the GPS signals acquired by the GPS reception section 43. In the case where a road that is present under the earth's surface is included in the comparison target roads, further, the control section 20 determines the road that is present under the earth's surface as a candidate road, and reduces the probability at which the candidate road is estimated to be the road on which the current location is present. Then, the control section 20 performs the map matching process on the basis of the comparison target roads including the candidate road to specify the current location on the road specified through the map matching process.

In the case where it is not determined in step S125 that a road that is present under the earth's surface is present around the current location, on the other hand, the result of the determination made in step S125 and the result of the determinations made in steps S100 and S105 are consistent with each other. Thus, the control section 20 increases the probability at which the current location is present on a road that is present on the earth's surface (step S130). That is, through processing performed by the navigation program 21, the control section 20 acquires information output from the vehicle speed sensor 41 and the gyro sensor 42 as autonomous navigation information, and acquires an autonomous navigation track which is a track of the vehicle indicated by the autonomous navigation information in the chronological order. In addition, the control section 20 sets a plurality of comparison target roads on which the current location of the vehicle may be present on the basis of the autonomous navigation track and the map information 30a, and narrows down the comparison target roads on the basis of an error circle of the GPS signals acquired by the GPS reception section 43. Further, the control section 20 references the map information 30a which indicates the comparison target roads, specifies from the comparison target roads a road correlated with information indicating that the road is a road between high-rise buildings or a road correlated with information indicating that the road is a road under an elevated road, and determines such a road as a candidate road. In addition, the control section 20 increases the probability at which the candidate road is estimated to be a road on which the current location is present. Then, the control section 20 performs the map matching process on the basis of the comparison target roads to specify the current location on the road specified through the map matching process. The process described above enables the current location to be specified accurately.

(2) Second Embodiment (2-1) Configuration of Navigation Terminal

Figure 3:
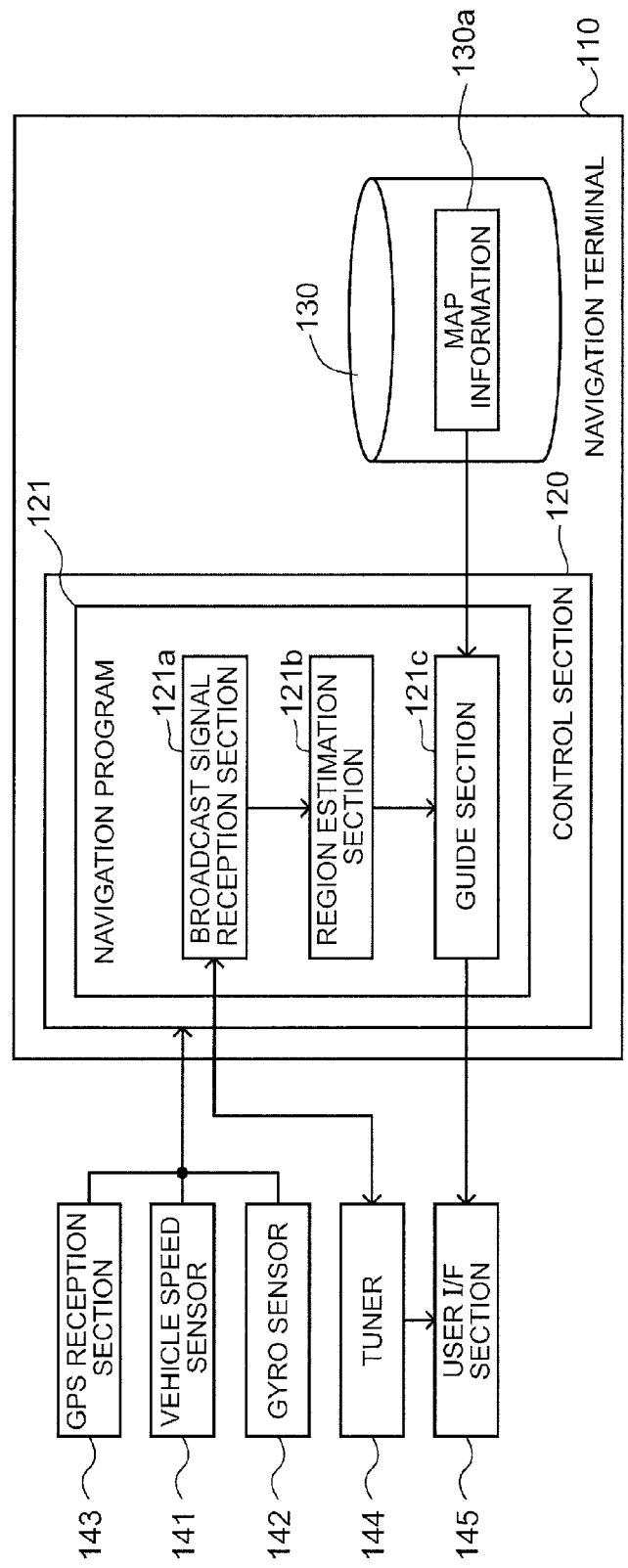
FIG. 3 is a block diagram illustrating a navigation terminal according to a second embodiment.

FIG. 3 is a block diagram illustrating the configuration of a navigation system mounted on a vehicle. In the embodiment, the navigation system is implemented by a navigation terminal 110. The navigation terminal 110 can be implemented by the configuration that is substantially similar to that of the navigation terminal 10. Components that are similar to those of the navigation terminal 10 are given the same name as those of the navigation terminal 10, and will not be described. In addition, the GPS signal reception section 21a may be omitted. In the embodiment, if a road indicated by link data of map information 130a is a road in an aboveground multi-level parking lot, the link data are correlated with attribute information indicating that the road is a road in an aboveground multi-level parking lot, and if a road indicated by the link data is a road under an elevated road, the link data are correlated with attribute information indicating that the road is a road under an elevated road.

In addition, a tuner 144 is a communication section that acquires a broadcast signal (in the embodiment, an AM radio broadcast signal and an FM radio broadcast signal) transmitted from one or more senders (including relay stations) in order to reproduce broadcast based on the broadcast signal. A control section 120 controls the tuner 144 through processing performed by a broadcast signal reception section 121a so as to receive a first broadcast signal which is a radio wave in a first frequency band and a second broadcast signal which is a radio wave in a second frequency band that is higher in frequency than the first frequency band. That is, the control section 120 demodulates broadcast signals in desired channels that belong to each of the first frequency band and the second frequency band through processing performed by the broadcast signal reception section 121a. In the embodiment, since the second frequency band is higher in frequency than the first frequency band, the AM radio broadcast signal is the first broadcast signal, and the FM radio broadcast signal is the second broadcast signal.

The signals demodulated by the tuner 144 are output to a speaker of a user I/F section 145. In the embodiment, in addition, the tuner 144 outputs to the control section 120 a signal that indicates the signal intensity which corresponds to the status of reception of the broadcast signal. The control section 120 receives the signal which indicates the signal intensity through processing performed by the broadcast signal reception section 121a to specify the signal intensity. The signal intensity is referenced in processing performed by a region estimation section 121b. The signal intensity can be acquired even when the user of the navigation terminal 110 is not listening to a radio broadcast based on the first broadcast signal or the second broadcast signal.

The region estimation section 121b is a program module that causes the control section 120 to execute a function of specifying the current location of the navigation terminal 110. In the embodiment, in specifying the current location, the region estimation section 121b causes the control section 120 to execute a function of estimating a region in which the current location is present on the basis of a combination of the status of reception of the first broadcast signal and the status of reception of the second broadcast signal. In the embodiment, the region in which the current location is present is a road, and therefore a candidate region in which the current location may be present is called a candidate road.

That is, the control section 120 sets a plurality of comparison target roads, on which the current location of the vehicle may be present, on the basis of the autonomous navigation information which is information output from a vehicle speed sensor 141 and a gyro sensor 142 and the map information 130a through processing performed by the region estimation section 121b, narrows down the comparison target roads on the basis of an error circle of the GPS signals acquired by the GPS reception section 143, performs a map matching process in which the road for which the shape of the comparison target road and the autonomous navigation track best match each other is considered as the road on which the vehicle is traveling, and specifies the current location on the road specified through the map matching process.

In the embodiment, further, the accuracy of specifying the current location is improved by adjusting the probability at which the specified candidate road is estimated to be the road on which the current location is present on the basis of the status of reception of the broadcast signals. That is, broadcast signals are transmitted in accordance with various types of communication scheme, and there may occur a situation in which broadcast signals according to different schemes that utilize radio waves in different frequency bands are transmitted in the same region. Then, when broadcast signals in different frequency bands are compared with each other, the broadcast signals differ from each other in straight-travel property, reflection property, degree of diffraction, etc. because of a difference in frequency (or wavelength) or modulation scheme, and therefore there may be a difference in status of reception in the same region. For example, the distance that a broadcast signal may reach and the degree to which a broadcast signal enters a building differ in accordance with the frequency.

For an AM radio broadcast and an FM radio broadcast that can be received by the tuner 144 according to the embodiment, the AM radio broadcast signal (first broadcast signal) may be received in a wide region compared to the FM radio broadcast signal (second broadcast signal). However, the FM radio broadcast signal is easily received in a three-dimensional structure compared to the AM radio broadcast signal. Thus, a certain location can be estimated by analyzing the status of reception of radio waves at the location. As a result, the accuracy of specifying the current location can be improved.

Specifically, the control section 120 specifies candidate roads on which the current location may be present from comparison target roads within the error circle on the basis of the combination of the status of reception of the first broadcast signal and the status of reception of the second broadcast signal through processing performed by the region estimation section 121b, and relatively increases the probability at which the current location is estimated to be present on the specified candidate roads compared to the other comparison target roads. Here, as a matter of course, roads on which the current location may not be present may be specified on the basis of the combination of the status of reception of the first broadcast signal and the status of reception of the second broadcast signal, and the probability at which the current location is estimated to be present on such roads may be relatively reduced.

In the embodiment, it is only necessary that whether the status of reception is good or poor and the degree to which the status of reception is good or poor should be defined such that roads on which the current location is present at a high probability or roads on which the current location is present at a low probability can be specified in accordance with the combination of the status of reception of the first broadcast signal and the status of reception of the second broadcast signal. Thus, in the embodiment, the control section 120 determines whether or not the statuses of reception of the first broadcast signal and the second broadcast signal have been degraded compared to a reference status of reception, and specifies roads on which the current location is present at a high probability or roads on which the current location is present at a low probability in accordance with the determination result.

Here, the reference status of reception is an index for judging whether or not the status of reception of the first broadcast signal or the status of reception of the second broadcast signal has been degraded. In the embodiment, a normal status of reception of the first broadcast signal while the vehicle is traveling on an aboveground road with few blocking objects is defined as the reference status of reception for the first broadcast signal, and a normal status of reception of the second broadcast signal in such a state is defined as the reference status of reception for the second broadcast signal. The reference status of reception can be specified at various timings. In the embodiment, in the case where the status of reception of a broadcast signal is degraded, the status of reception before the degradation is specified and defined as the reference status of reception.

In the embodiment, further, the degree of degradation compared to the reference status of reception is defined by (value indicating the status of reception as a result of the degradation)/(value indicating the reference status of reception), which is a relative value. In the embodiment, further, it is only necessary that a predetermined degree for evaluating the degree of degradation should be defined such that a region in which the current location is present can be estimated as a result of determining whether or not the degree of degradation of the statuses of reception of the first broadcast signal and the second broadcast signal compared to the reference status of reception is larger than the predetermined degree. Thus, the predetermined degree is estimated and set in advance such that the current location is estimated correctly with certain likelihood or more in accordance with the combination of the statuses of reception which have been classified in accordance with the predetermined degree. Specifically, in the case where the degree of degradation compared to the reference status of reception, which is (value indicating the status of reception as a result of the degradation)/(value indicating the reference status of reception), becomes equal to or less than a predetermined value, the status of reception of a broadcast signal is considered to be degraded compared to the reference status of reception.

Here, as a matter of course, it is only necessary that the predetermined degree should be set such that a region in which the current location is present can be estimated as a result of determining whether or not the degree of degradation of the statuses of reception of the first broadcast signal and the second broadcast signal compared to the reference status of reception is larger than the predetermined degree, and the predetermined degree may be the same criterion or different criteria for the first broadcast signal and the second broadcast signal.

It is only necessary that roads on which the current location is present at a high probability or roads on which the current location is present at a low probability should be correlated in advance with a combination of the status of reception of the first broadcast signal and the status of reception of the second broadcast signal. For example, correlation illustrated in Table 2 may be assumed.

TABLE 2

| Second broadcast signal | First broadcast signal | |
|---|---|---|
| | Reception status: good | Reception status: poor |
| Reception status: good | Road in urban area | Road in aboveground multi-level parking lot (or region in aboveground multi-level parking lot) Road under elevated road |

TABLE 2-continued

| Second broadcast signal | First broadcast signal | |
|---|---|---|
| | Reception status: good | Reception status: poor |
| Reception status: poor | Road in remote area | Underground road Road in underground parking lot (or region in underground parking lot) |

Specifically, a broadcast signal in a band at high frequencies (with short wavelengths) easily enters a structure through diffraction compared to a broadcast signal in a band at low frequencies (with long wavelengths). Thus, on roads around which a three-dimensional structure is present such as an aboveground multi-level parking lot which is surrounded by walls that lead to the outside and a road under an elevated road, the statuses of reception of the broadcast signals are poorer than those on outdoor roads, but the status of reception of the second broadcast signal at a relatively high frequency is often better than the status of reception of the first broadcast signal. Thus, in the case where the degree of degradation of the status of reception of the first broadcast signal compared to the reference status of reception is larger than the predetermined degree and the degree of degradation of the status of reception of the second broadcast signal compared to the reference status of reception is smaller than the predetermined degree, a road around which a three-dimensional structure is present may be specified as a candidate road such that the current location is considered to be present on the road around which a three-dimensional structure is present at a high probability.

On roads that are present under the earth's surface such as an underground road and an in-tunnel road, further, it is difficult to receive the broadcast signals unless a relay is provided. Thus, in the case where the degree of degradation of the status of reception of the first broadcast signal compared to the reference status of reception is larger than the predetermined degree and the degree of degradation of the status of reception of the second broadcast signal compared to the reference status of reception is larger than the predetermined degree, a road that is present under the earth's surface may be specified as a candidate road such that the current location is considered to be present on the road that is present under the earth's surface at a high probability.

Further, a situation in which the first broadcast signal at a relatively low frequency (with long wavelengths) reaches distant locations compared to the second broadcast signal at a relatively high frequency (with short wavelengths) may occur in practice. For example, the AM radio broadcast signal broadcast in Japan tends to reach distant locations compared to the FM radio broadcast signal. Thus, such locations may be defined in advance as remote areas, and in the case where the degree of degradation of the status of reception of the first broadcast signal compared to the reference status of reception is smaller than the predetermined degree and the degree of degradation of the status of reception of the second broadcast signal compared to the reference status of reception is larger than the predetermined degree, a road that is present in a remote area may be specified as a candidate road such that the current location is considered to be present on the road that is present in a remote area at a high probability.

As has been described above, roads on which the current location is present at a high probability or roads on which the current location is present at a low probability can be specified in accordance with the combination of the status of reception of the first broadcast signal and the status of reception of the second broadcast signal. Thus, the control section 120 can improve the accuracy of specifying the current location by adjusting the probability at which the current location is estimated to be present on a candidate road in accordance with the combination of the status of reception of the first broadcast signal and the status of reception of the second broadcast signal in the case where each road indicated in Table 2 is determined as the candidate road.

(2-2) Current Location Specifying Process

Next, an example of a current location specifying process will be described in detail. In the embodiment, when a navigation program 121 is executed, the control section 120 executes a process for displaying a map on the display section of the user I/F section 145 through processing performed by a guide section 121c. That is, the control section 120 outputs to the user I/F section 145 a control signal for depicting a map of the periphery of the current location of the vehicle and the current location of the vehicle on the basis of the map information 130a. As a result, a map of the periphery of the current location of the vehicle and the current location of the vehicle are depicted on the display section of the user I/F section 145.

In order to acquire or update the current location while the display section of the user I/F section 145 is displaying such display, the control section 120 executes the current location specifying process at intervals of a predetermined period (e.g. 100 ms). In the current location specifying process illustrated in FIG. 4, through processing performed by the broadcast signal reception section 121a and the region estimation section 121b, the control section 120 determines whether or not the degree of degradation of the status of reception of the first broadcast signal compared to the reference status of reception is larger than the predetermined degree (step S200). That is, the control section 120 acquires the signal intensity indicating the status of reception of the first broadcast signal through processing performed by the broadcast signal reception section 121a, and determines that the status of reception has been degraded in the case where the signal intensity is stable at a predetermined level or higher in the former period of the most recent predetermined period and the signal intensity is lowered in the latter period of the most recent predetermined period. In the case where the status of reception is considered to be degraded, in addition, the average value of the signal intensity during the period at a stable signal intensity is acquired as a reference intensity, and the minimum value of the signal intensity after the degradation is acquired as a value that indicates the status of reception as a result of the degradation. Then, the control section 120 determines that the degree of degradation of the status of reception of the first broadcast signal compared to the reference status of reception is larger than the predetermined degree in the case where (minimum value of the signal intensity)/(average value of the signal intensity) is equal to or less than a predetermined value through processing performed by the region estimation section 121b. The predetermined level can be defined in accordance with the minimum value of the level that enables a broadcast to be reproduced adequately or the like.

Figure 5A:
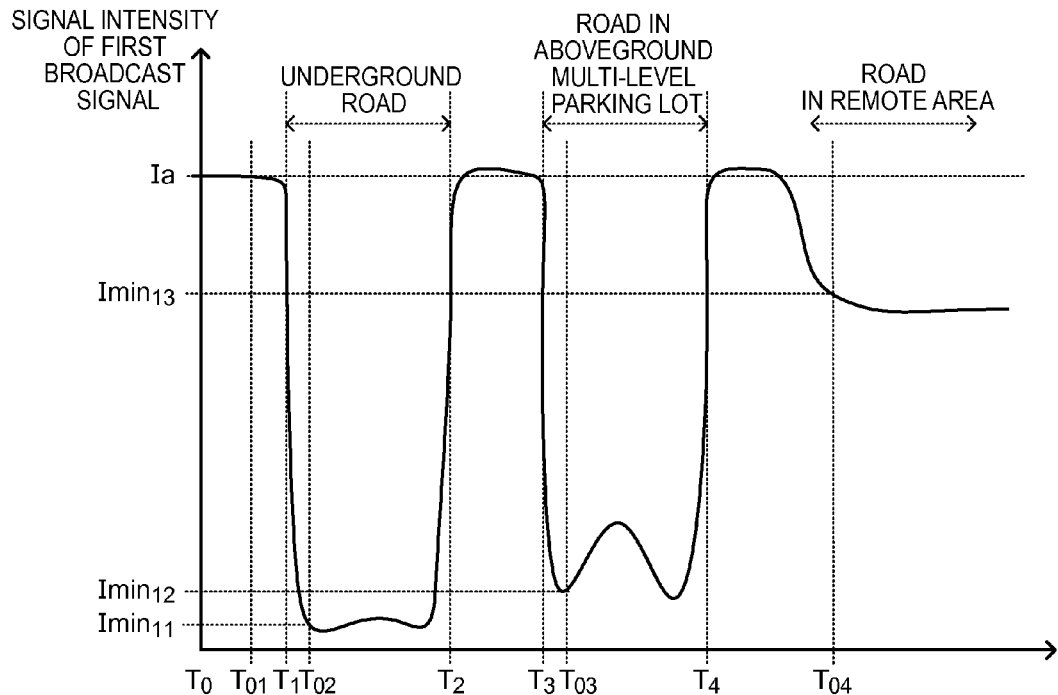
FIG. 5A schematically illustrates the status of reception of a first broadcast signal on roads, and FIG. 5B schematically illustrates the status of reception of a second broadcast signal on the roads.

FIG. 5A schematically illustrates the status of reception of the first broadcast signal on roads, in which the horizontal axis indicates the time and the vertical axis indicates the signal intensity. In FIG. 5A, the signal intensity of the first broadcast signal is indicated for a case where the vehicle travels on a road with few blocking objects from time $T_0$ to time $T_1$, the vehicle enters an underground road at time $T_1$, the vehicle exits the underground road at time $T_2$, the vehicle travels on a road with few blocking objects from time $T_2$ to time $T_3$, the vehicle enters a road in an aboveground multi-level parking lot at time $T_3$, the vehicle exits the road in an aboveground multi-level parking lot at time $T_4$, and the vehicle travels on a road with few blocking objects after time $T_4$ to thereafter reach a road in a remote area. In the example, it is assumed that the signal intensity of the broadcast signals in the case where the vehicle is traveling on a road with few blocking objects is at the predetermined level or higher.

In the case where step S200 is executed at time $T_{02}$ of the example and the signal intensity is analyzed with a period since time $T_0$ until time $T_{02}$ considered as the predetermined period, the control section 120 determines that the signal intensity is stable at the predetermined level or higher in the former period (since time $T_0$ to time $T_{01}$) of the predetermined period. Because the signal intensity is lowered in the latter period (since time $T_{01}$ to time $T_{02}$) of the predetermined period, the signal intensity is degraded, and the control section 120 calculates (minimum value $Imin_{11}$ of the signal intensity)/(average value Ia of the signal intensity), which is the degree of degradation of the first broadcast signal compared to the reference status of reception. Here, in the case where a predetermined degree for determining the degree of degradation of the first broadcast signal compared to the reference status of reception is set to 0.5, for example, the control section 120 determines that the degree of degradation of the status of reception of the first broadcast signal compared to the reference status of reception is larger than the predetermined degree because (minimum value $Imin_{11}$ of the signal intensity)/(average value Ia of the signal intensity) is equal to or less than 0.5 in the example illustrated in FIG. 5A.

Also in the case where the control section 120 executes step S200 at time $T_{03}$, in addition, it is considered that the degree of degradation of the status of reception of the first broadcast signal compared to the reference status of reception is larger than the predetermined degree because (minimum value $Imin_{12}$ of the signal intensity)/(average value Ia of the signal intensity) is equal to or less than 0.5 in the example illustrated in FIG. 5A. In the case where the control section 120 executes step S200 at time $T_{04}$, on the other hand, it is not determined that the degree of degradation of the status of reception of the first broadcast signal compared to the reference status of reception is larger than the predetermined degree because (minimum value $Imin_{13}$ of the signal intensity)/(average value Ia of the signal intensity) is not equal to or less than 0.5 in the example illustrated in FIG. 5A.

In the case where it is determined in step S200 that the degree of degradation of the status of reception of the first broadcast signal compared to the reference status of reception is larger than the predetermined degree, the control section 120 determines in step S205 whether or not the degree of degradation of the status of reception of the second broadcast signal compared to the reference status of reception is larger than the predetermined degree. In the case where it is not determined in step S200 that the degree of degradation of the status of reception of the first broadcast signal compared to the reference status of reception is larger than the predetermined degree, it is determined in step S240 whether or not the degree of degradation of the status of reception of the second broadcast signal compared to the reference status of reception is larger than the predetermined degree.

That is, the determination processes in steps S205 and S240 are the same determination process, and the control section 120 performs a determination on the basis of the signal intensity which indicates the status of reception of the second broadcast signal acquired through processing performed by the broadcast signal reception section 121a. Specifically, the control section 120 determines that the status of reception has been degraded in the case where the signal intensity of the second broadcast signal is stable at the predetermined level or higher in the former period of the most recent predetermined period and the signal intensity is lowered in the latter period of the most recent predetermined period. In the case where the status of reception is considered to be degraded, in addition, the average value of the signal intensity during the period at a stable signal intensity is acquired as a reference intensity, and the minimum value of the signal intensity after the degradation is acquired as a value that indicates the status of reception as a result of the degradation. Then, the control section 120 determines that the degree of degradation of the status of reception of the second broadcast signal compared to the reference status of reception is larger than the predetermined degree in the case where (minimum value of the signal intensity)/(average value of the signal intensity) is equal to or less than a predetermined value through processing performed by the region estimation section 121b.

Figure 5B:
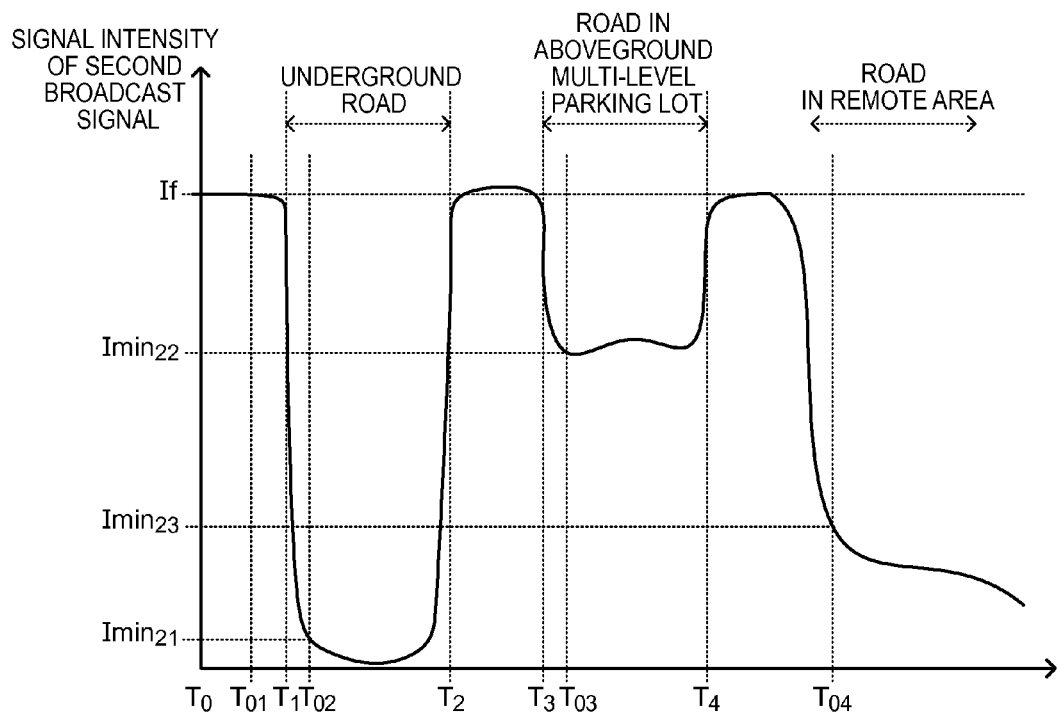

FIG. 5B schematically illustrates the status of reception of the second broadcast signal for a case where the vehicle travels on roads under the same condition as FIG. 5A, in which the horizontal axis indicates the time and the vertical axis indicates the signal intensity. The signal intensity indicated in FIG. 5B is the intensity for the second broadcast signal. Therefore, the degree of reduction in signal intensity during the period since time $T_1$ until time $T_2$, during which the vehicle is traveling on an underground road, is equivalent to that in FIG. 5A, but the degree of reduction in signal intensity during a period since time $T_3$ until time $T_4$, during which the vehicle is traveling on a road in an aboveground multi-level parking lot, is smaller than the degree of reduction indicated in FIG. 5A. In addition, the degree of reduction in signal intensity at the time when the vehicle is traveling on a road in a remote area is larger than the degree of reduction indicated in FIG. 5A.

In the case where the control section 120 executes step S205 or S240 at time $T_{02}$ of the example, the control section 120 determines that the degree of degradation of the status of reception of the second broadcast signal compared to the reference status of reception is larger than the predetermined degree because (minimum value $Imin_{21}$ of the signal intensity)/(average value If of the signal intensity) is equal to or less than 0.5 in the example illustrated in FIG. 5B. In the case where the control section 120 executes step S205 or S240 at time $T_{03}$, meanwhile, the control section 120 does not determine that the degree of degradation of the status of reception of the second broadcast signal compared to the reference status of reception is larger than the predetermined degree because (minimum value $Imin_{22}$ of the signal intensity)/(average value If of the signal intensity) is not equal to or less than 0.5 in the example illustrated in FIG. 5B.

In the case where the control section 120 executes step S205 or S240 at time $T_{04}$, on the other hand, the control section 120 determines that the degree of degradation of the status of reception of the second broadcast signal compared to the reference status of reception is larger than the predetermined degree because (minimum value $Imin_{23}$ of the signal intensity)/(average value If of the signal intensity) is equal to or less than 0.5 in the example illustrated in FIG. 5B.

In the case where it is not determined in step S205 that the degree of degradation of the status of reception of the second broadcast signal compared to the reference status of reception is larger than the predetermined degree, the situation is as in the period since time $T_3$ to time $T_4$ illustrated in FIGS. 5A and 5B, and the current location is present on a road around which a three-dimensional structure is present at a high probability. Thus, the control section 120 determines whether or not a road around which a three-dimensional structure is present is present around the current location through processing performed by the region estimation section 121b (step S210). That is, the control section 120 references the map information 130a, and, within the error circle centered on the location which last recorded as the current location (the current location specified in the preceding current location specifying process), determines whether or not there is a road correlated with information indicating that the road is a road in an aboveground multi-level parking lot or a road correlated with information indicating that the road is a road under an elevated road. In the case where there is any such road, the control section 120 determines that a road around which a three-dimensional structure is present is present around the current location.

Then, in the case where it is not determined in step S210 that a road around which a three-dimensional structure is present is present around the current location, the result of the determination made in step S210 and the result of the determinations made in steps S200 and S205 contradict each other. Thus, the control section 120 does not perform a process for adjusting the probability at which the current location is estimated to be present on the candidate road on the basis of the broadcast signals, but specifies the current location through a normal process (step S215). That is, through processing performed by the navigation program 121, the control section 120 acquires information output from the vehicle speed sensor 141 and the gyro sensor 142 as autonomous navigation information, and acquires an autonomous navigation track which is a track of the vehicle indicated by the autonomous navigation information in the chronological order. In addition, the control section 120 sets a plurality of comparison target roads on which the current location of the vehicle may be present on the basis of the autonomous navigation track and the map information 130a, and narrows down the comparison target roads on the basis of an error circle of the GPS signals acquired by the GPS reception section 143. Further, the control section 120 performs a map matching process in which the road for which the shape of the comparison target road and the autonomous navigation track best match each other is considered as the road on which the vehicle is traveling, and specifies the current location on the road specified through the map matching process.

In the case where it is determined in step S210 that a road around which a three-dimensional structure is present is present around the current location, on the other hand, the result of the determination made in step S210 and the result of the determinations made in steps S200 and S205 are consistent with each other. Thus, the control section 120 increases the probability at which the current location is present on the road around which a three-dimensional structure is present (step S220). That is, through processing performed by the navigation program 121, the control section 120 acquires information output from the vehicle speed sensor 141 and the gyro sensor 142 as autonomous navigation information, and acquires an autonomous navigation track which is a track of the vehicle indicated by the autonomous navigation information in the chronological order. In addition, the control section 120 sets a plurality of comparison target roads on which the current location of the vehicle may be present on the basis of the autonomous navigation track and the map information 130a, and narrows down the comparison target roads on the basis of an error circle of the GPS signals acquired by the GPS reception section 143. Further, the control section 120 specifies from the comparison target roads a road around which a three-dimensional structure is present as a candidate road, and increases the probability at which the candidate road is estimated to be the road on which the current location is present. The process can be achieved by increasing an index indicating the degree of coincidence between the autonomous navigation track and the road shape of the candidate road by a certain proportion in the map matching process, for example. Then, the control section 120 performs the map matching process on the basis of the comparison target roads to specify the current location on the road specified through the map matching process.

In the case where it is determined in step S205 that the degree of degradation of the status of reception of the second broadcast signal compared to the reference status of reception is larger than the predetermined degree, on the other hand, the situation is as in the period since time $T_1$ to time $T_2$ illustrated in FIGS. 5A and 5B, and the current location is present on a road that is present under the earth's surface at a high probability. Thus, the control section 120 determines whether or not a road that is present under the earth's surface is present around the current location through processing performed by the region estimation section 121b (step S225). That is, the control section 120 references the map information 130a, and, within the error circle centered on the location which has last recorded as the current location (the current location specified in the preceding current location specifying process), determines whether or not there is a road correlated with information indicating that the road is an underground road or a road correlated with information indicating that the road is a road in an underground parking lot. In the case where there is any such road, the control section 120 determines that a road that is present under the earth's surface is present around the current location.

Then, in the case where it is not determined in step S225 that a road that is present under the earth's surface is present around the current location, the result of the determination made in step S225 and the result of the determinations made in steps S200 and S205 contradict each other. Thus, the control section 120 does not perform a process for adjusting the probability at which the current location is estimated to be present on the candidate road on the basis of the broadcast signals, but specifies the current location through a normal process (step S230).

In the case where it is determined in step S225 that a road that is present under the earth's surface is present around the current location, on the other hand, the result of the determination made in step S225 and the result of the determinations made in steps S200 and S205 are consistent with each other. Thus, the control section 120 increases the probability at which the current location is present on the road that is present under the earth's surface (step S235). That is, through processing performed by the navigation program 121, the control section 120 acquires information output from the vehicle speed sensor 141 and the gyro sensor 142 as autonomous navigation information, and acquires an autonomous navigation track which is a track of the vehicle indicated by the autonomous navigation information in the chronological order. In addition, the control section 120 sets a plurality of comparison target roads on which the current location of the vehicle may be present on the basis of the autonomous navigation track and the map information 130a, and narrows down the comparison target roads on the basis of an error circle of the GPS signals acquired by the GPS reception section 143. Further, the control section 120 specifies from the comparison target roads a road that is present under the earth's surface as a candidate road, and increases the probability at which the candidate road is estimated to be the road on which the current location is present. Then, the control section 120 performs the map matching process on the basis of the comparison target roads to specify the current location on the road specified through the map matching process.

In the case where it is determined in step S240 that the degree of degradation of the status of reception of the second broadcast signal compared to the reference status of reception is larger than the predetermined degree, the situation is as at and after time $T_{04}$ illustrated in FIGS. 5A and 5B, and the current location is present on a road that is present in a remote area at a high probability. Thus, the control section 120 determines whether or not a road that is present in a remote area is present around the current location through processing performed by the region estimation section 121b (step S250). That is, the control section 120 references the map information 130a, and, within the error circle centered on the location which last recorded as the current location (the current location specified in the preceding current location specifying process), determines whether or not there is a road correlated with information indicating that the road is a road that is present in a remote area.

Then, in the case where it is not determined in step S250 that a road that is present in a remote area is present around the current location, the result of the determination made in step S250 and the result of the determinations made in steps S200 and S205 contradict each other. Thus, the control section 120 does not perform a process for adjusting the probability at which the current location is estimated to be present on the candidate road on the basis of the broadcast signals, but specifies the current location through a normal process (step S255).

In the case where it is determined in step S250 that a road that is present in a remote area is present around the current location, on the other hand, the result of the determination made in step S250 and the result of the determinations made in steps S200 and S240 are consistent with each other. Thus, the control section 120 increases the probability at which the current location is present on the road that is present in a remote area (step S260). That is, through processing performed by the navigation program 121, the control section 120 acquires information output from the vehicle speed sensor 141 and the gyro sensor 142 as autonomous navigation information, and acquires an autonomous navigation track which is a track of the vehicle indicated by the autonomous navigation information in the chronological order. In addition, the control section 120 sets a plurality of comparison target roads on which the current location of the vehicle may be present on the basis of the autonomous navigation track and the map information 130a, and narrows down the comparison target roads on the basis of an error circle of the GPS signals acquired by the GPS reception section 143. Further, the control section 120 specifies from the comparison target roads a road that is correlated with information indicating that the road is a road that is present in a remote area as a candidate road, and increases the probability at which the candidate road is estimated to be the road on which the current location is present. Then, the control section 120 performs the map matching process on the basis of the comparison target roads to specify the current location on the road specified through the map matching process.

In the case where it is not determined in step S240 that the degree of degradation of the status of reception of the second broadcast signal compared to the reference status of reception is larger than the predetermined degree, on the other hand, the control section 120 specifies the current location through a normal process (step S245). That is, in the case where it is not determined in step S240 that the degree of degradation of the status of reception of the second broadcast signal compared to the reference status of reception is larger than the predetermined degree, both the status of reception of the first broadcast signal and the status of reception of the second broadcast signal are good. Therefore, the control section 120 does not perform a process for adjusting the probability at which the current location is estimated to be present on the candidate road on the basis of the broadcast signals, but specifies the current location through a normal process.

(3) Other Embodiments

The embodiments described above are examples for implementing the inventive principles described herein, and a variety of other embodiments can be adopted as long as a region in which the current location is present is estimated on the basis of the combination of the status of reception of the GPS signals and the status of reception of the broadcast signal. For example, the navigation terminal 10, 110 may be permanently mounted on the vehicle, or may be a portable navigation terminal 10, 110 that can be brought into the vehicle to be utilized.

Further, information to be referenced in order to specify the current location is not limited to the autonomous navigation information and the GPS signals, and other factors such as the vehicle speed and traffic information, for example, may be referenced to specify from the comparison target roads a road on which the current location is present at a high probability to estimate a region in which the current location is present. Even with such a configuration in which the current location is specified through a comprehensive judgment made in accordance with various judgment criteria, it is possible to improve the accuracy of specifying the current location by estimating a region in which the current location is present on the basis of the combination of the status of reception of the first signal and the status of reception of the second signal and using such an estimation as judgment criteria for specifying the current location.

Further, it is only necessary that the status of reception should be defined to be better as the probability at which information superimposed on the first signal or the second signal can be recovered correctly is higher and the amount of information that can be recovered correctly is larger. Thus, the status of reception may be defined to be better as the signal intensity is higher, the status of reception may be defined to be better as the communication quality other than the C/N (such as the S/N, the modulation error ratio, and the bit error rate) is higher, or the status of reception may be considered to be good in the case where a parameter (e.g. gain) for signal demodulation etc, indicates a high communication quality.

Further, the predetermined criterion for determining whether or not the status of reception is good may be a criterion for directly evaluating the status of reception, or may be a criterion for indirectly evaluating the status of reception. For the former, for example, a threshold may be set for the signal intensity, a value that indicates the communication quality, a parameter for signal demodulation, etc., which are indices for evaluating the status of reception, and the threshold may be compared with the signal intensity, the value that indicates the communication quality, the parameter for signal demodulation, etc. to evaluate whether or not the status of reception is poorer than the predetermined criterion. For the latter, for example, a threshold may be set for the reliability of the current location obtained in accordance with the GPS signals or an index that indicates whether or not the broadcast content can be demodulated in accordance with the broadcast signal (such as the degree of noise contained in a broadcast audio or a broadcast image), and the threshold may be compared with the reliability or the index to evaluate whether or not the status of reception is poorer than the predetermined criterion.

Further, the broadcast signal is not limited to a radio broadcast signal, and may be a broadcast signal that can be received by the navigation terminal 10, e.g. a television broadcast signal. Further, the current location specifying process illustrated in FIG. 2 is merely one example, and may be modified as appropriate. For example, in the current location specifying process illustrated in FIG. 2, in the case where it is determined in step S100 that the status of reception of the GPS signals is good, the probability at which the candidate road is the road on which the current location is present may be adjusted further in the case where the status of reception of the broadcast signal is good and in the case where the status of reception of the broadcast signal is poor. For example, in the case where the status of reception of the broadcast signal is good and an elevated road or a road in an urban area that commands a fine view is included in the comparison target roads, the elevated road or the road in an urban area that commands a fine view may be considered as a candidate region, and the probability at which such a road is estimated to be the road on which the current location is present may be increased. In the case where the status of reception of the broadcast signal is poor and a road in a remote area is included in the comparison target roads, meanwhile, such a road may be determined as a candidate region, and the probability at which the road in a remote area may be estimated to be the road on which the current location is present may be increased.

Further, in step S125 of the current location specifying process illustrated in FIG. 2, it may be determined whether or not a road that is present on the earth's surface is present around the current location. That is, the probability at which the current location is present on a road that is present on the earth's surface may be reduced in step S130 in the case where it is not determined in step S125 that a road that is present on the earth's surface is present around the current location, or the probability at which the current location is present on a road that is present on the earth's surface may be increased in step S135 in the case where it is determined in step S125 that a road that is present on the earth's surface is present around the current location.

Further, various kinds of definitions other than the definition used in the embodiments discussed above may be adopted as the reference status of reception of the broadcast signal. For example, a status of reception of the broadcast signal in the state in which the broadcast content is reproduced appropriately may be used as the reference status of reception. In addition, the reference status of reception can be specified at various timings. It is only necessary that the status of reception in the case where the current location is estimated to be present on an aboveground road with few blocking objects should be used as the reference status of reception. Further, the degree of degradation compared to the reference status of reception may be evaluated by an absolute value, e.g. (value indicating the reference status of reception)−(value indicating the status of reception as a result of the degradation). In addition, the predetermined degree for evaluating the degree of degradation compared to the reference status of reception may be set in advance by actually measuring the predetermined degree such that the current location can be statistically estimated in accordance with whether or not the status of reception is good for the predetermined degree.

Further, it is only necessary that the tuner 144 should be able to receive broadcast signals in different frequency bands. It is only necessary that the first broadcast signal and the second broadcast signal should differ from each other in at least the frequency band of radio waves, and that the first broadcast signal and the second broadcast signal should be distinguished from each other such that a road can be estimated from the combination of the status of reception of the first broadcast signal and the status of reception of the second broadcast signal because of the difference in frequency band.

In addition, the first broadcast signal and the second broadcast signal may be different from or identical to each other in elements other than the frequency band such as the modulation scheme and the information expression mode (analog or digital), for example. As a matter of course, the broadcast signals are not limited to radio broadcast signals, and may be television broadcast signals.

Further, regions which are subjected to a determination as to whether or not the current location is present in the region are not limited to roads defined by nodes and links. For example, in the map information 30a, 130a, roads in aboveground multi-level parking lots and roads in underground parking lots are often not defined by nodes and links. In such a case, a map matching process cannot be performed on roads in aboveground multi-level parking lots and roads in underground parking lots. By analyzing the combination of the status of reception of the GPS signals and the status of reception of the broadcast signal, however, it is possible to estimate that the current location is present in a region in an aboveground multi-level parking lot or a region in an underground parking lot. Thus, for regions in aboveground multi-level parking lots and regions in underground parking lots not defined by nodes and links, as indicated in the parentheses in Table 1 and Table 2, it may be determined whether or not the current location is present in a region in an aboveground multi-level parking lot or a region in an underground parking lot on the basis of the combination of the status of reception of the GPS signals and the status of reception of the broadcast signal.

The invention claimed is:

1. A navigation system, comprising:
a signal receiver configured to receive a first signal and a second signal that is different from the first signal;
a memory storing a region estimation program; and
a processor that, when executing the stored program, estimates a region in which a current location is present on the basis of a combination of a status of reception of the first signal and a status of reception of the second signal by:
specifying a candidate region in which the current location may be present on the basis of a combination of a status of reception of the first and a status of reception of the second signal: and
relatively increasing a probability at which the current location is estimated to be present in the candidate region.

2. The navigation system according to claim 1, wherein the signal receiver comprises:
a GPS signal receiver configured to receive a GPS signal transmitted from a GPS satellite as the first signal; and
a broadcast signal receiver configured to receive a broadcast signal as the second signal.

3. The navigation system according to claim 2, wherein the processor, when executing the stored program, specifies a road that is present on an earth's surface as the candidate region in the case where the status of reception of the GPS signal is poorer than a predetermined criterion and the status of reception of the broadcast signal is better than a predetermined criterion.

4. The navigation system according to claim 3, wherein the processor, when executing the stored program, in the case where the status of reception of the GPS signal is poorer than the predetermined criterion, the status of reception of the broadcast signal is better than the predetermined criterion, and there is a road which is present under the earth's surface and on which the broadcast signal can be received within a range of a predetermined distance from a current location specified on the basis of the GPS signal, specifies such a road as the candidate region.

5. The navigation system according to claim 2, wherein the processor, when executing the stored program, specifies a road that is present under an earth's surface as the candidate region in the case where the status of reception of the GPS signal is poorer than a predetermined criterion and the status of reception of the broadcast signal is poorer than a predetermined criterion.

6. The navigation system according to claim 2, wherein the processor, when executing the stored program, specifies a road that is present in a remote area as the candidate region in the case where the status of reception of the GPS signal is better than a predetermined criterion and the status of reception of the broadcast signal is poorer than a predetermined criterion.

7. The navigation system according to claim 2, wherein the processor, when executing the stored program, specifies an elevated road as the candidate region in the case where the status of reception of the GPS signal is better than a predetermined criterion and the status of reception of the broadcast signal is better than a predetermined criterion.

8. The navigation system according to claim 1, wherein:
the first broadcast signal is a radio wave in a first frequency band as the first signal; and
the a second broadcast signal is a radio wave in a second frequency band that is higher in frequency than the first frequency band as the second signal.

9. The navigation system according to claim 8, wherein the processor, when executing the stored program, specifies a road around which a three-dimensional structure is present as the candidate region in the case where a degree of degradation of the status of reception of the first broadcast signal compared to a reference status of reception is larger than a predetermined degree and a degree of degradation of the status of reception of the second broadcast signal compared to a reference status of reception is smaller than a predetermined degree.

10. The navigation system according to claim 8, wherein the processor, when executing the stored program, specifies a road that is present under an earth's surface as the candidate region in the case where a degree of degradation of the status of reception of the first broadcast signal compared to a reference status of reception is larger than a predetermined degree and a degree of degradation of the status of reception of the second broadcast signal compared to a reference status of reception is larger than a predetermined degree.

11. The navigation system according to claim 8, wherein the processor, when executing the stored program, specifies a road that is present in a remote area as the candidate region in the case where a degree of degradation of the status of reception of the first broadcast signal compared to a reference status of reception is smaller than a predetermined degree and a degree of degradation of the status of reception of the second broadcast signal compared to a reference status of reception is larger than a predetermined degree.

12. A control method for a navigation system, the method comprising:
 receiving, with a signal receiver, a first signal and a second signal that is different from the first signal; and
 estimating, with a processor, a region in which a current location is present on the basis of a combination of a status of reception of the first signal and a status of reception of the second signal by:
  specifying a candidate region in which the current location may be present on the basis of a combination of a status of reception of the first signal and a status of reception of the second signal; and
  relatively increasing a probability at which the current location is estimated to be present in the candidate region.

13. A non-transitory computer-readable storage medium storing a computer-executable control program for a navigation system, the program comprising:
 instructions for receiving, with a signal receiver, a first signal and a second signal that is different from the first signal; and
 instructions for estimating a region in which a current location is present on the basis of a combination of a status of reception of the first signal and a status of reception of the second signal by:
  specifying a candidate region in which the current location may be present on the basis of a combination of a status of reception of the first signal and a status of reception of the second signal: and
  relatively increasing a probability at which the current location is estimated to be present in the candidate region.

* * * * *